United States Patent [19]
Pechanek et al.

[11] Patent Number: 6,151,668
[45] Date of Patent: Nov. 21, 2000

[54] METHODS AND APPARATUS FOR EFFICIENT SYNCHRONOUS MIMD OPERATIONS WITH IVLIW PE-TO-PE COMMUNICATION

[75] Inventors: Gerald G. Pechanek, Cary; Thomas L. Drabenstott, Chapel Hill; Juan Guillermo Revilla, Cary; David Carl Strube, Raleigh; Grayson Morris, Durham, all of N.C.

[73] Assignee: Billions of Operations Per Second, Inc., Chapel Hill, N.C.

[21] Appl. No.: 09/187,539

[22] Filed: Nov. 6, 1998

Related U.S. Application Data

[60] Provisional application No. 60/064,619, Nov. 7, 1997.

[51] Int. Cl.$^7$ .................................................. G06F 9/00
[52] U.S. Cl. .............................. 712/24; 712/22; 712/215
[58] Field of Search ............................... 712/22, 24, 215

[56] References Cited

U.S. PATENT DOCUMENTS

| | | | |
|---|---|---|---|
| 5,649,135 | 7/1997 | Pechanek et al. | 395/396 |
| 5,659,785 | 8/1997 | Pechanek et al. | 395/800.11 |
| 5,682,491 | 10/1997 | Pechanek et al. | 395/385 |
| 6,026,478 | 2/2000 | Dowling | 712/24 |
| 6,076,154 | 6/2000 | Van Eijndhoven | 712/24 |

OTHER PUBLICATIONS

G.D. Jones and L.D. Larsen, "Selecting Predecoded Instructions with a Surrogate", IBM Technical Disclosure Bulletin, vol. 36, No. 06A, Jun. 1993, pp. 35–37.

G.D. Jones and L.D. Larsen, "Pre–Composed Superscalar Architecture", IBM Technical Bulletin, vol. 37, No. 09, Sep. 1994, pp. 447–451.

Managawa et al, Pre–Decoding Mechanism for Superscalar Architecture, IEEE, May 1991, pp. 1–8.

Johnson, John D., Expansion Caches for Superscalar Processors, Stanford University, Jun. 1994, pp. 1–8.

*Primary Examiner*—Eric Coleman
*Attorney, Agent, or Firm*—Law Offices of Peter H. Priest

[57] ABSTRACT

A SIMD machine employing a plurality of parallel processor (PEs) in which communications hazards are eliminated in an efficient manner. An indirect Very Long Instruction Word instruction memory (VIM) is employed along with execute and delimiter instructions. A masking mechanism may be employed to control which PEs have their VIMs loaded. Further, a receive model of operation is preferably employed. In one aspect, each PE operates to control a switch that selects from which PE it receives. The present invention addresses a better machine organization for execution of parallel algorithms that reduces hardware cost and complexity while maintaining the best characteristics of both SIMD and MIMD machines and minimizing communication latency. This invention brings a level of MIMD computational autonomy to SIMD indirect Very Long Instruction Word (iVLIW) processing elements while maintaining the single thread of control used in the SIMD machine organization. Consequently, the term Synchronous-MIMD (SMIMD) is used to describe the present approach.

41 Claims, 18 Drawing Sheets

FIG. 4A

LV - LOAD MODIFY VLIW ~400

ENCODING ~410

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | | Ctrl0p | | | | UAF | | 0 | | InstrCnt | | | 0 | 0 | SU | LU | ALU | MAU | DSU | Vb | 0 | VIMOFFS | | | | | | | |

{ 411 }

SYNTAX/OPERATION ~420

| INSTRUCTION | OPERANDS | OPERATION |
|---|---|---|
| LV.[SP] | V[01], VIMOFFS, InstrCnt, d={SLAMD}, F={AMD} | (V[01]+VIMOFFS)[SU] ── disable if (d=S)<br>(V[01]+VIMOFFS)[LU] ── disable if (d=L)<br>(V[01]+VIMOFFS)[ALU] ── disable if (d=A)<br>(V[01]+VIMOFFS)[MAU] ── disable if (d=M)<br>(V[01]+VIMOFFS)[DSU] ── disable if (d=D)<br>(V[01]+VIMOFFS)[UAF] ── ALU if (F=A or F=)<br>(V[01]+VIMOFFS)[UAF] ── MAU if (F=M)<br>(V[01]+VIMOFFS)[UAF] ── DSU if (F=D)<br>if (instrCnt > 0)<br>  Load next InstrCnt instructions into<br>  (V[01]+VIMOFFS) |

FIG. 4B

XV - EXECUTE VLIW — 425

ENCODING — 430

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Group | | S/P | | Ctrlop | | | VX | UAF | | 0 | 0 | 0 | 0 | 0 | 0 | 0 | SU | LU | ALU | MAU | DSU | Vb | 0 | VIMOFFS | | | | | | | |

431

SYNTAX/OPERATION — 435

| INSTRUCTION | OPERANDS | OPERATION |
|---|---|---|
| XV.[SP] | V[01], VIMOFFS, E={SLAMD}, F={AMDN} | Execute (V[01]+VIMOFFS)[SU] if (E=S)<br>Execute (V[01]+VIMOFFS)[LU] if (E=L)<br>Execute (V[01]+VIMOFFS)[ALU] if (E=A)<br>Execute (V[01]+VIMOFFS)[MAU] if (E=M)<br>Execute (V[01]+VIMOFFS)[DSU] if (E=D)<br>(V[01]+VIMOFFS)[UAF] ⟶ ALU if (F= or F=A)<br>(V[01]+VIMOFFS)[UAF] ⟶ MAU if (F=M)<br>(V[01]+VIMOFFS)[UAF] ⟶ DSU if (F=D) |

FIG. 4C

440 — INSTRUCTION FIELD DEFINITIONS

| NAME | BITS | DESCRIPTION/VALUES |
|---|---|---|
| ALU | 1 | ALU INSTRUCTION SLOT (USED BY LV AND XV INSTRUCTION)<br>0 = DO NOT DISABLE ALU SLOT (LV);DO NOT EXECUTE ALU SLOT (XV)<br>1 = DISABLE ALU SLOT (LV); EXECUTE ALU SLOT (XV) |
| CE2 | 2 | CONDITIONAL EXECUTION (T,F)<br>00 = EXECUTE INSTRUCTION. DO NOT AFFECT ARITHMETIC CONDITION FLAGS<br>01 = EXECUTE INSTRUCTION IF F0 = 1(TRUE). DO NOT AFFECT ARITHMETIC CONDITION FLAGS<br>10 = EXECUTE INSTRUCTION IF F0 = 0(FALSE). DO NOT AFFECT ARITHMETIC CONDITION FLAGS<br>11 = RESERVED |
| CtrlOp | 4 | FLOW CONTROL OPERATION<br>0000 = LOOP, LOOPI<br>0001 = RET<br>0010 = CALL<br>0011 = JMP<br>0100 = LV<br>0101 = XV<br>0110 = RESERVED<br>0111 = RESERVED<br>1000 = RESERVED<br>1001 = RETI<br>1010 = TRAP<br>1011 = RESERVED<br>1100 = RESERVED<br>1101 = RESERVED<br>1110 = NOP<br>1111 = SVC |
| DPack | 3 | INTEGER DATA PACKING<br>000 = 4 BYTES (4B)<br>001 = 2 HALFWORDS (2H)<br>010 = 1 WORD (1W)<br>011 = RESERVED<br>100 = 8 BYTES (8B)<br>101 = 4 HALFWORDS (4H)<br>110 = 2 WORDS (2W)<br>111 = 1 DOUBLEWORD (1D) |
| DSU | 1 | DSU INSTRUCTION SLOT (USED BY LV AND XV INSTRUCTION)<br>0 = DO NOT DISABLE DSU SLOT (LV); DO NOT EXECUTE DSU SLOT (XV)<br>1 = DISABLE DSU SLOT (LV); EXECUTE DSU SLOT (XV) |
| GROUP | 2 | INSTRUCTION GROUP<br>00 = RESERVED<br>01 = FLOW CONTROL<br>10 = LOAD/STORE (LU/SU)<br>11 = ARITHMETIC/LOGICAL (ALU, MAU, DSU) |

FIG. 4D
INSTRUCTION FIELD DEFINITIONS (CONTINUED)

| Field | Bits | Description |
|---|---|---|
| InstrCnt | 4 | INSTRUCTION COUNT - USED IN LV INSTRUCTION TO SPECIFY THE NUMBER OF INSTRUCTIONS TO LOAD<br>0xxx = 0 INSTRUCTIONS TO LOAD<br>1000 = 1 INSTRUCTION TO LOAD<br>1001 = 2 INSTRUCTIONS TO LOAD<br>1010 = 3 INSTRUCTIONS TO LOAD<br>1011 = 4 INSTRUCTIONS TO LOAD<br>1100 = 5 INSTRUCTIONS TO LOAD<br>1101 = RESERVED<br>1110 = RESERVED<br>1111 = RESERVED |
| LU | 1 | LU INSTRUCTION SLOT (USED BY LV AND XV INSTRUCTION)<br>0 = DO NOT DISABLE LU SLOT (LV); DO NOT EXECUTE LU SLOT (XV)<br>1 = DISABLE LU SLOT (LV); EXECUTE LU SLOT (XV) |
| MAU | 1 | MAU INSTRUCTION SLOT (USED BY LV AND XV INSTRUCTION)<br>0 = DO NOT DISABLE MAU SLOT (LV); DO NOT EXECUTE MAU SLOT (XV)<br>1 = DISABLE MAU SLOT (LV); EXECUTE MAU SLOT (XV) |
| S/P | 1 | SP/PE SELECT<br>0 = SP<br>1 = PE |
| SU | 1 | SU INSTRUCTION SLOT (USED BY LV AND XV INSTRUCTION)<br>0 = DO NOT DISABLE SU SLOT (LV); DO NOT EXECUTE SU SLOT (XV)<br>1 = DISABLE SU SLOT (LV); EXECUTE SU SLOT (XV) |
| UAF | 2 | UNIT AFFECTING FLAGS<br>00 = ALU<br>01 = MAU<br>10 = DSU<br>11 = RESERVED |
| UNIT | 2 | ARITHMETIC EXECUTION UNIT<br>00 = ALU<br>01 = MAU<br>10 = DSU<br>11 = RESERVED |
| Vb | 1 | VIM BASE REGISTER SELECT<br>0 = V0<br>1 = V1 |
| VimOffs | 8 | VIM OFFSET - CONTAINS THE OFFSET FROM THE BASE VIM ADDRESS REGISTER TO SELECT WHICH VIM TO LOAD (LV) OR EXECUTE (XV)<br>0-255 IS THE ARCHITECTED RANGE OF VLIW OFFSETS. PLEASE REFER TO YOUR SPECIFIC CONFIGURATION FOR THE VALID ADDRESSABLE VIM. |
| VX | 2 | VLIW EXTENSION - SPECIFIES IF THIS XV OVERRIDES THE LV UAF SETTING<br>0 = DO NOT OVERRIDE LV UAF SETTING<br>1 = OVERRIDE THE LV UAF SETTING WITH THE ONE SPECIFIED IN THE UAF FIELD |

FIG. 4E

ADD - ADD ─── 450
ENCODING ─── 455

| 31 30 | 29 | 28 27 | 26 25 24 23 22 21 | 20 19 18 17 16 | 15 | 14 13 12 11 | 10 9 8 7 6 | 5 | 4 3 | 2 1 0 |
|---|---|---|---|---|---|---|---|---|---|---|
| Group | S/P | Unit | ALUopcode | Rt | | Rx | Ry | | 0 CE2 | DPack |
| | | | MAUopcode | Rte | 0 | Rxe | 0 Rye | 0 | | |

SYNTAX/OPERATION ─── 460

| INSTRUCTION | OPERANDS | OPERATION | ACF |
|---|---|---|---|
| | | | DOUBLEWORD |
| ADD.S[AM].1D | Rte,Rxe,Rye | Rto\|\|Rte←Rxo\|\|Rxe+Ryo\|\|Rye | NONE |
| [TF].ADD.S[AM].1D | Rte,Rxe,Rye | DO OPERATION ONLY IF T/F CONDITION IS SATISFIED IN F0 | NONE |
| | | | WORD |
| ADD.S[AM].1W | Rt,Rx,Ry | Rt←Rx+Ry | NONE |
| [TF].ADD.S[AM].1W | Rt,Rx,Ry | DO OPERATION ONLY IF T/F CONDITION IS SATISFIED IN F0 | NONE |
| | | | DUAL WORDS |
| ADD.S[AM].2W | Rte,Rxe,Rye | Rto←Rxo+Ryo<br>Rte←Rxe+Rye | NONE |
| [TF].ADD.S[AM].2W | Rte,Rxe,Rye | DO OPERATION ONLY IF T/F CONDITION IS SATISFIED IN F0 | NONE |
| | | | DUAL HALFWORDS |
| ADD.S[AM].2H | Rt,Rx,Ry | Rt.H1←Rx.H1+Ry.H1<br>Rt.H0←Rx.H0+Ry.H0 | NONE |
| [TF].ADD.S[AM].2H | Rt,Rx,Ry | DO OPERATION ONLY IF T/F CONDITION IS SATISFIED IN F0 | NONE |
| | | | QUAD HALFWORDS |
| ADD.S[AM].4H | Rte,Rxe,Rye | Rto.H1←Rxo.H1+Ryo.H1<br>Rto.H0←Rxo.H0+Ryo.H0<br>Rte.H1←Rxe.H1+Rye.H1<br>Rte.H0←Rxe.H0+Rye.H0 | NONE |
| [TF].ADD.S[AM].4H | Rte,Rxe,Rye | DO OPERATION ONLY IF T/F CONDITION IS SATISFIED IN F0 | NONE |
| | | | QUAD BYTES |
| ADD.S[AM].4B | Rt,Rx,Ry | Rt.B3←Rx.B3+Ry.B3<br>Rt.B2←Rx.B2+Ry.B2<br>Rt.B1←Rx.B1+Ry.B1<br>Rt.B0←Rx.B0+Ry.B0 | NONE |
| [TF].ADD.S[AM].4B | Rt,Rx,Ry | DO OPERATION ONLY IF T/F CONDITION IS SATISFIED IN F0 | NONE |
| | | | OCTAL BYTES |
| ADD.S[AM].8B | Rte,Rxe,Rye | Rto.B3←Rxo.B3+Ryo.B3<br>Rto.B2←Rxo.B2+Ryo.B2<br>Rto.B1←Rxo.B1+Ryo.B1<br>Rto.B0←Rxo.B0+Ryo.B0<br>Rte.B3←Rxe.B3+Rye.B3<br>Rte.B2←Rxe.B2+Rye.B2<br>Rte.B1←Rxe.B1+Rye.B1<br>Rte.B0←Rxe.B0+Rye.B0 | NONE |
| [TF].ADD.S[AM].8B | Rte,Rxe,Rye | DO OPERATION ONLY IF T/F CONDITION IS SATISFIED IN F0 | NONE |

FIG. 4F1

| VLIW | PE # | LOAD UNIT (LU) | MULTIPLY-ACCUMULATE UNIT (MAU) | ARITHMETIC LOGIC UNIT (ALU) |
|---|---|---|---|---|
| 27 | 0 | | | |
| | 1 | load nx1 | nx3 * Lx | ny1 * Ly + (nx1 * Lx + nz1 * Lz) |
| | 2 | load ny1 | ny3 * Ly | (n2*L)<=0? |
| | 3 | load nz1 | nz3 * Lz | nx3 * Lx + nz3 * Lz |
| 28 | 0 | | | |
| | 1 | load nx2 | nx1 * Lx | nx1 * Lx + nz1 * Lz |
| | 2 | load ny2 | ny1 * Ly | nz2 * Lz + (nx2 * Lx + ny2 * Ly) |
| | 3 | load nz2 | nz1 * Lz | (n3*L)<=0? |
| 29 | 0 | | | |
| | 1 | load nx3 | nx2 * Lx | |
| | 2 | load ny3 | ny2 * Ly | (n1*L)<=0? |
| | 3 | load nz3 | nz2 * Lz | ny3 * Ly + (nx3 * Lx + nz3 * Lz) |
| 27 | 0 | | | |
| | 1 | li.p.w R1,A1+,A7 | fmpy.pm.1fw R6,R3,R31 | |
| | 2 | li.p.w R1,A1+,A7 | fmpy.pm.1fw R6,R3,R31 | |
| | 3 | li.p.w R1,A1+,A7 | fmpy.pm.1fw R6,R3,R31 | |
| 28 | 0 | | | |
| | 1 | li.p.w R2,A1+,A7 | fmpy.pm.1fw R4,R1,R31 | fadd.pa.1fw R10,R9,R8 |
| | 2 | li.p.w R2,A1+,A7 | fmpy.pm.1fw R4,R1,R31 | fcmpLE.pa.1fw R10,R0 |
| | 3 | li.p.w R2,A1+,A7 | fmpy.pm.1fw R4,R1,R31 | fadd.pa.1fw R9,R7,R4 |
| 29 | 0 | | | |
| | 1 | li.p.w R3,A1+,A7 | fmpy.pm.1fw R5,R2,R31 | fadd.pa.1fw R10,R9,R8 |
| | 2 | li.p.w R3,A1+,A7 | fmpy.pm.1fw R5,R2,R31 | fcmpLE.pa.1fw R10,R0 |
| | 3 | li.p.w R3,A1+,A7 | fmpy.pm.1fw R5,R2,R31 | fcmpLE.pa.1fw R9,R7,R5 |
| | | | | fadd.pa.1fw R10,R9,R8 |

FIG. 4F2

| DATA SELECT UNIT (DSU) | STORE UNIT (SU) |
|---|---|
| get nz1 * Lz | STORE 1 INTO F1 |
| send ny3 * Ly | advance to and store n1L |
|  | if so, store 0 over n2L |
| get ny3 * Ly / send NEW nz1 * Lz |  |
| get ny1 * Ly / send nx2 * Lx | STORE 1 INTO F2 |
| get nx2 * Lx / send ny1 * Ly | advance to and store n2L |
|  | if so, store 0 over n3L |
| send nx3 * Lx |  |
| get nz2 * Lz | STORE 1 INTO F3 |
| get nx3 * Lx / send nz2 * Lz | advance to and store n3L |
| pexchg.pd.w R7,R0,2x2_PE3 | si.p.w R1,A2+,R28 |
| pexchg.pd.w R15,R6,2x2_PE2 | si.p.w R10,+A2,A6 |
| pexchg.pd.w R8,R4,2x2_PE2 | t.sii.p.w R0,A2+,0 |
| pexchg.pd.w R8,R5,2x2_PE2 | si.p.w R1,A2+,R28 |
| pexchg.pd.w R7,R4,2x2_PE1 | si.p.w R10,+A2,A6 |
|  | t.sii.p.w R0,A2+,0 |
| pexchg.pd.w R15,R6,2x2_PE1 | si.p.w R1,A2+,R28 |
| pexchg.pd.w R8,R0,2x2_PE3 | t.sii.p.w R0,A2+,0 |
| pexchg.pd.w R7,R5,2x2_PE1 | si.p.w R10,+A2,A6 |

TRANSLATION EXTENSION OPTIONS
BIT-30 OPCODE EXTENSION
BIT-28 REGISTER FILE EXTENSION
BIT-27 CONDITIONAL EXECUTION EXTENSION ent invention claims the benefit of U.S. Provisional Application Ser. No. 60/064,619 entitled "Methods and Apparatus for Efficient Synchronous MIMD VLIW Communication" and filed Nov. 7, 1997.

METHODS AND APPARATUS FOR EFFICIENT SYNCHRONOUS MIMD OPERATIONS WITH IVLIW PE-TO-PE COMMUNICATION

RELATED APPLICATIONS

The present invention claims the benefit of U.S. Provisional Application Ser. No. 60/064,619 entitled "Methods and Apparatus for Efficient Synchronous MIMD VLIW Communication" and filed Nov. 7, 1997.

FIELD OF THE INVENTION

For any Single Instruction Multiple Data stream (SIMD) machine with a given number of parallel processing elements, there will exist algorithms which cannot make efficient use of the available parallel processing elements, or, in other words, the available computing resources. Multiple Instruction Multiple Data stream (MIMD) class machines execute some of these algorithms with more efficiency but require additional hardware to support a separate instruction stream on each processor and lose performance due to communication latency with tightly coupled program implementations. The present invention addresses a better machine organization for execution of these algorithms that reduces hardware cost and complexity while maintaining the best characteristics of both SIMD and MIMD machines and minimizing communication latency. The present invention provides a level of MIMED computational autonomy to SIMD indirect Very Long Instruction Word (iVLIW) processing elements while maintaining the single thread of control used in the SIMD machine organization. Consequently, the term Synchronous-MIMD (SMIMD) is used to describe the invention.

BACKGROUND OF THE INVENTION

There are two primary parallel programming models, the SIMD and the MIMD models. In the SIMD model, there is a single program thread which controls multiple processing elements (PEs) in a synchronous lock-step mode. Each PE executes the same instruction but on different data. This is in contrast to the MIMD model where multiple program threads of control exist and any inter-processor operations must contend with the latency that occurs when communicating between the multiple processors due to requirements to synchronize the independent program threads prior to communicating. The problem with SIMD is that not all algorithms can make efficient use of the available parallelism existing in the processor. The amount of parallelism inherent in different algorithms varies leading to difficulties in efficiently implementing a wide variety of algorithms on SIMD machines. The problem with MIMD machines is the latency of communications between multiple processors leading to difficulties in efficiently synchronizing processors to cooperate on the processing of an algorithm. Typically, MIMD machines also incur a greater cost of implementation as compared to SIMD machines since each MIMD PE must have its own instruction sequencing mechanism which can amount to a significant amount of hardware. MIMD machines also have an inherently greater complexity of programming control required to manage the independent parallel processing elements. Consequently, levels of programming complexity and communication latency occur in a variety of contexts when parallel processing elements are employed. It will be highly advantageous to efficiently address such problems as discussed in greater detail below.

SUMMARY OF THE INVENTION

The present invention is preferably used in conjunction with the ManArray architecture various aspects of which are described in greater detail in U.S. patent application Ser. No. 08/885,310 filed Jun. 30, 1997 now U.S. Pat. No. 6,023,753, U.S. Ser. No. 08/949,122 filed Oct. 10, 1997, U.S. Ser. No. 09/169,255 filed Oct. 9, 1998, U.S. Ser. No. 09/169,256 filed Oct. 9, 1998 and U.S. Ser. No. 09/169,072 filed Oct. 9, 1998, Provisional Application Ser. No. 60/067,511 entitled "Method and Apparatus for Dynamically Modifying Instructions in a Very Long Instruction Word Processor" filed Dec. 4, 1997, Provisional Application Ser. No. 60/068,021 entitled "Methods and Apparatus for Scalable Instruction Set Architecture" filed Dec. 18, 1997, Provisional Application Ser. No. 60/071,248 entitled "Methods and Apparatus to Dynamically Expand the Instruction Pipeline of a Very Long Instruction Word Processor" filed Jan. 12, 1998, Provisional Application Ser. No. 60/072,915 entitled "Methods and Apparatus to Support Conditional Execution in a VLIW-Based Array Processor with Subword Execution" filed Jan. 28, 1988, Provisional Application Ser. No. 60/077,766 entitled "Register File Indexing Methods and Apparatus for Providing Indirect Control of Register in a VLIW Processor"; filed Mar. 12, 1998, Provisional Application Ser. No. 60/092,130 entitled "Methods and Apparatus for Instruction Addressing in Indirect VLIW Processors" filed on Jul. 9, 1998, Provisional Application Ser. No. 60/103,712 entitled "Efficient Complex Multiplication and Fast Fourier Transform (FFT) Implementation on the ManArray" filed on Oct. 9, 1998, and Provisional Application Ser. No. 60/106,867 entitled "Methods and Apparatus for Improved Motion Estimation for Video Encoding" filed on Nov. 3, 1998, respectively, all of which are assigned to the assignee of the present invention and incorporated herein in their entirety.

A ManArray processor suitable for use in conjunction with ManArray indirect Very Long Instruction Words (iVLIWs) in accordance with the present invention may be implemented as an array processor that has a Sequence Processor (SP) acting as an array controller for a scalable array of Processing Elements (PEs) to provide an indirect Very Long Instruction Word architecture. Indirect Very Long Instruction Words (iVLIWs) in accordance with the present invention may be composed in an iVLIW Instruction Memory (VIM) by the SIMD array controller Sequence Processor or SP. Preferably, VIM exists in each Processing Element or PE and contains a plurality of iVLIWs. After an iVLIW is composed in VIM, another SP instruction, designated XV for "execute iVLIW" in the preferred embodiment, concurrently executes the iVLIW at an identical VIM address in all PEs. If all PE VIMs contain the same instructions, SIMD operation occurs. A one-to-one mapping exists between the XV instruction and the single identical iVLIW that exists in each PE.

To increase the efficiency of certain algorithms running on the ManArray, it is possible to operate indirectly on VLIW instructions stored in a VLIW memory with the indirect execution initiated by an execute VLIW (XV) instruction and with different VLIW instructions stored in the multiple PEs at the same VLIW memory address. When the SP instruction causes this set of iVLIWs to execute concurrently across all PEs, Synchronous MIMD or SMIMD operation occurs. A one-to-many mapping exists between the XV instruction and the multiple different iVLIWs that exist in each PE. No specialized synchronization mechanism is necessary since the multiple different iVLIW executions are instigated synchronously by the single controlling point SP with the issuance of the XV instruction. Due to the use of a Receive Model to govern communication between PEs and a ManArray network, the communication latency characteristic common to MIMD operations is avoided as discussed further below. Additionally, since there is only one synchronous locus of execution, additional MIMD hardware for separate program flow in each PE is not required. In this way, the machine is organized to support SMIMD operations at a reduced hardware cost while minimizing communication latency.

A ManArray indirect VLIW or iVLIW is preferably loaded under program control, although the alternatives of direct memory access (DMA) loading of the iVLIWs and implementing a section of VIM address space with ROM containing fixed iVLIWs are not precluded. To maintain a certain level of dynamic program flexibility, a portion of VIM, if not all of the VIM, will typically be of the random access type of memory. To load the random access type of VIM, a delimiter instruction, LV for Load iVLIW, specifies that a certain number of instructions that follow the delimiter are to be loaded into the VIM rather than executed. For SIMD operation, each PE gets the same instructions for each VIM address. To set up for SMIMD operation it is necessary to load different instructions at the same VIM address in each PE.

In the presently preferred embodiment, this is achieved by a masking mechanism that functions such that the loading of VIM only occurs on PEs that are masked ON. PEs that are masked OFF do not execute the delimiter instruction and therefore do not load the specified set of instructions that follow the delimiter into the VIM. Alternatively, different instructions could be loaded in parallel from the PE local memory or the VIM could be the target of a DMA transfer. Another alternative for loading different instructions into the same VIM address is through the use of a second LV instruction, LV2, which has a second 32-bit control word that follows the LV instruction. The first and second control words rearrange the bits between them so that a PE label can be added. This second LV2 approach does not require the PEs to be masked and may provide some advantages in different system implementations. By selectively loading different instructions into the same VIM address on different PEs, the ManArray is set up for SMIMD operation.

One problem encountered when implementing SMIMD operation is in dealing with inter-processing element communication. In SIMD mode, all PEs in the array are executing the same instruction. Typically, these SIMD PE-to-PE communications instructions are thought of as using a Send Model. That is to say, the SIMD Send Model communication instructions indicate in which direction or to which target PE, each PE should send its data. When a communication instruction such as SEND-WEST is encountered, each PE sends data to the PE topologically defined as being its western neighbor. The Send Model specifies both sender and receiver PEs. In the SEND-WEST example, each PE sends its data to its West PE and receives data from its East PE. In SIMD mode, this is not a problem.

In SMIMD mode of operation, using a Send Model, it is possible for multiple processing elements to all attempt to send data to the same neighbor. This attempt presents a hazardous situation because processing elements such as those in the ManArray may be defined as having only one receive port, capable of receiving from only one other processing element at a time. When each processing element is defined as having one receive port, such an attempted operation cannot complete successfully and results in a communication hazard.

To avoid the communication hazard described above, a Receive Model is used for the communication between PEs. Using the Receive Model, each processing element controls a switch that selects from which processing element it receives. It is impossible for communication hazards to occur because it is impossible for any two processing elements to contend for the same receive port. By definition, each PE controls its own receive port and makes data available without target PE specification. For any meaningful communication to occur between processing elements using the Receive Model, the PEs must be programmed to cooperate in the receiving of the data that is made available. Using Synchronous MIMD (SMIMD), this is guaranteed to occur if the cooperating instructions all exist at the same iVLIW location. Without SMIMD, a complex mechanism would be necessary to synchronize communications and use the Receive Model.

A more complete understanding of the present invention, as well as further features and advantages of the invention will be apparent from the following Detailed Description and the accompany drawings.

BRIEF DESCRIPTION OF THE DRAWINGS

FIG. 4A shows an LV Load/Modify VLIW Instruction;

FIG. 4B shows an XV Execute VLIW Instruction;

FIG. 4C shows instruction field definitions;

FIG. 4D shows further instruction field definitions;

FIG. 4E shows an ADD Instruction;

FIGS. 4F1–4F2 illustrates slot storage for three Synchronous MIMD iVLIWs in a 2×2 ManArray configuration;

DETAILED DESCRIPTION

Figure 1:
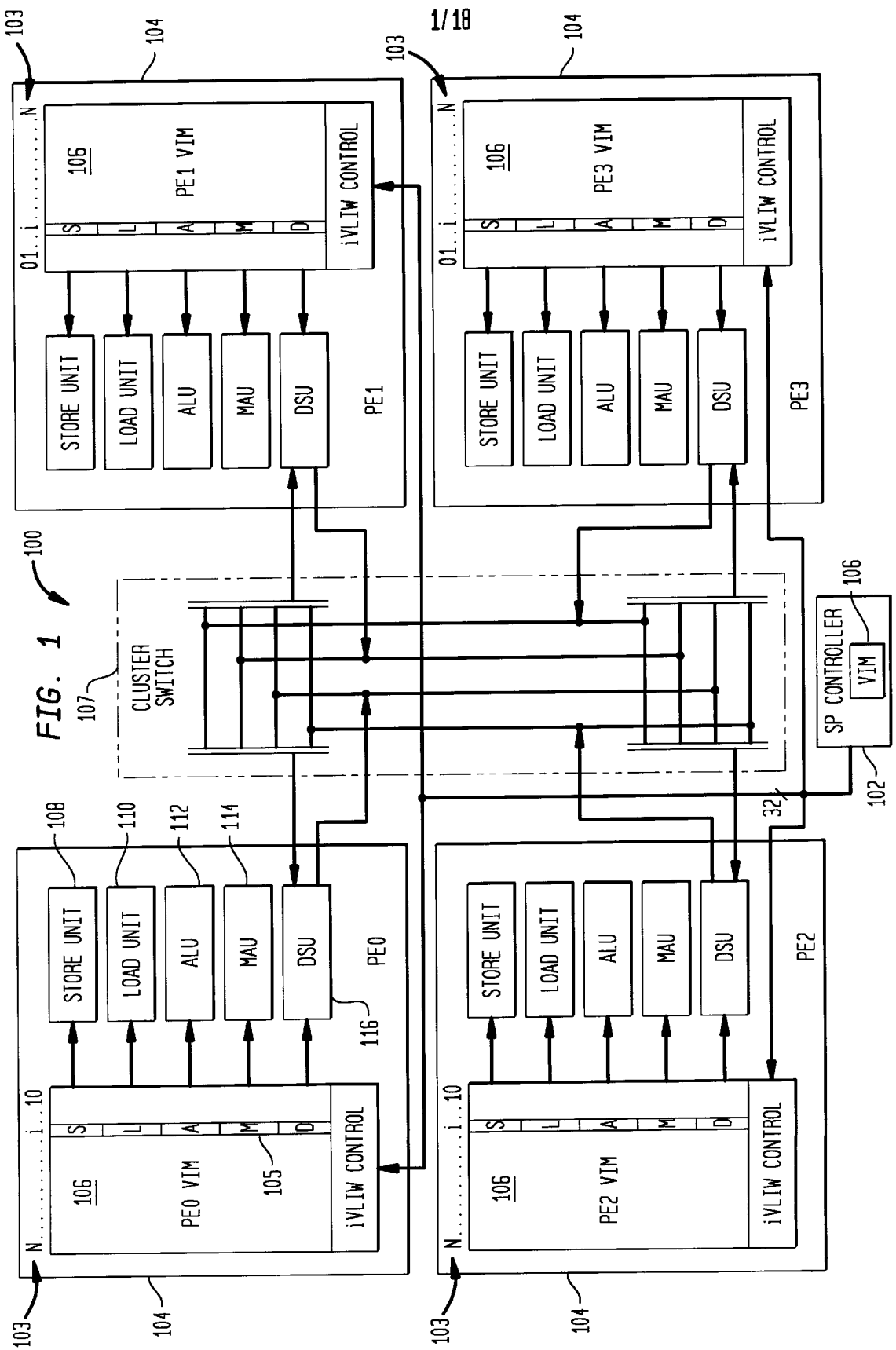
FIG. 1 illustrates various aspects of ManArray indirect VLIW instruction memory in accordance with the present invention.

One set of presently preferred indirect Very Long Instruction Word (iVLIW) control instructions for use in conjunction with the present invention is described in detail below. FIG. 1 depicts a system for the execution of the iVLIWs at Address "i", where the iVLIW is indicated by the vertical set of boxes SLAMD 105 in each VIM representing a S=Store, L=Load, A=Arithmetic Logic Unit (ALU), M=Multiply Accumulate Unit (MAU), and D=Data Select Unit (DSU) set of instructions, in a 2×2 ManArray 100 of PEs 104, PE0–PE3. In FIG. 1, the 2×2 ManArray 100 further includes a sequence processor (SP) controller 102 which dispatches 32-bit instructions to the array PEs over a single 32-bit bus. One type of 32-bit instruction is an execute iVLIW (XV) instruction which contains a VIM address offset value that is used in conjunction with a VIM base address to generate a pointer to the iVLIW which is desired to be executed. The PEs 104 are interconnected by a cluster switch 107.

The SP 102 and each PE 104 in the ManArray architecture as adapted for use in accordance with the present invention contains a quantity of iVLIW memory (VIM) 106 as shown in FIG. 1. Each VIM 106 contains storage space to hold multiple VLIW Instruction Addresses 103, and each Address is capable of storing up to eight simplex instructions. Presently preferred implementations allow each iVLIW instruction to contain up to five simplex instructions: one associated with each of the Store Unit 108, Load Unit 110, Arithmetic Logic Unit 112 (ALU), Multiply-Accumulate Unit 114 (MAU), and Data-Select Unit 116 (DSU) 116. For example, an iVLIW instruction at VIM address "i" 105 contains the five instructions SLAMD.

Figure 2:
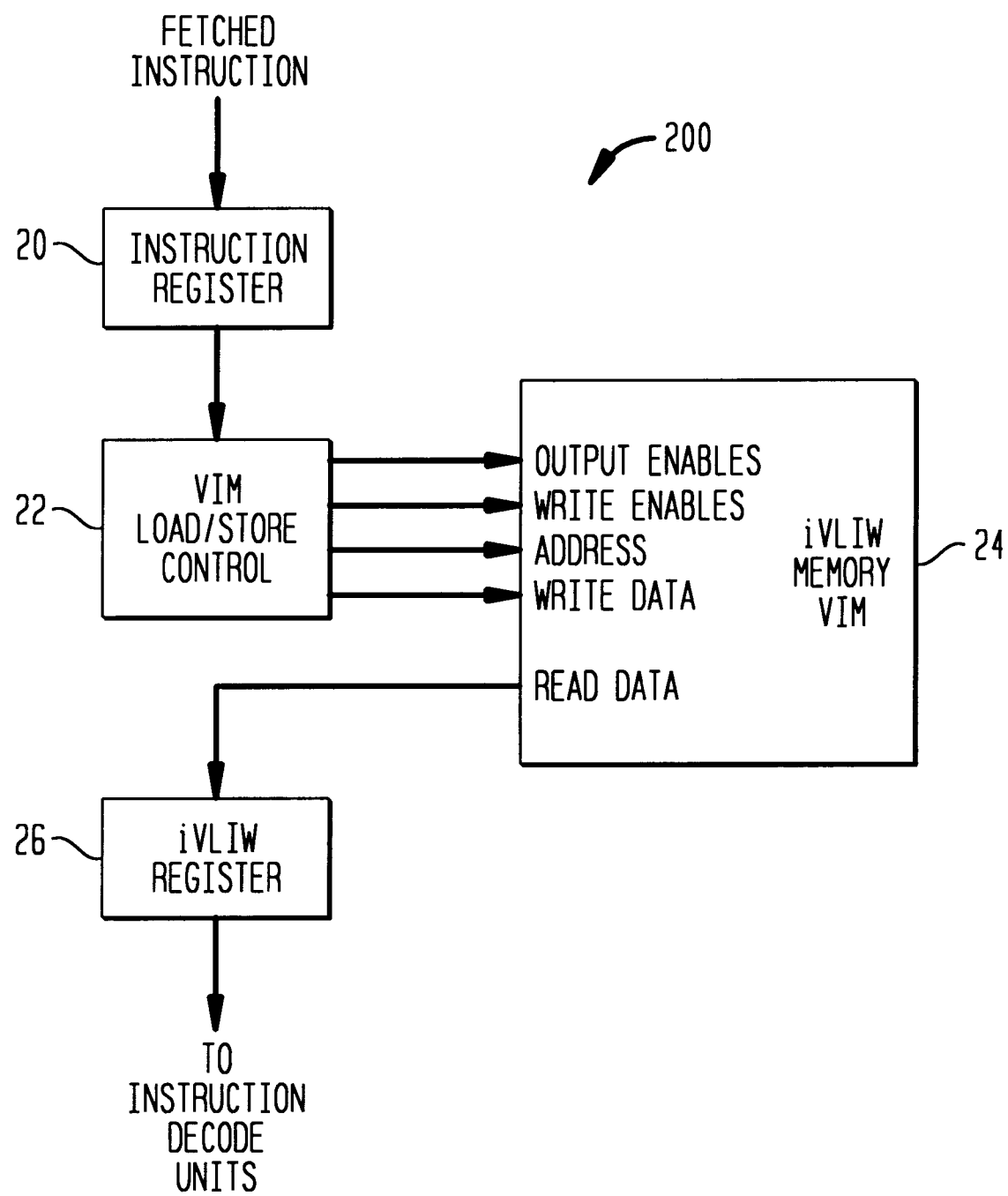
FIG. 2 illustrates a basic iVLIW Data Path.
Figure 3:
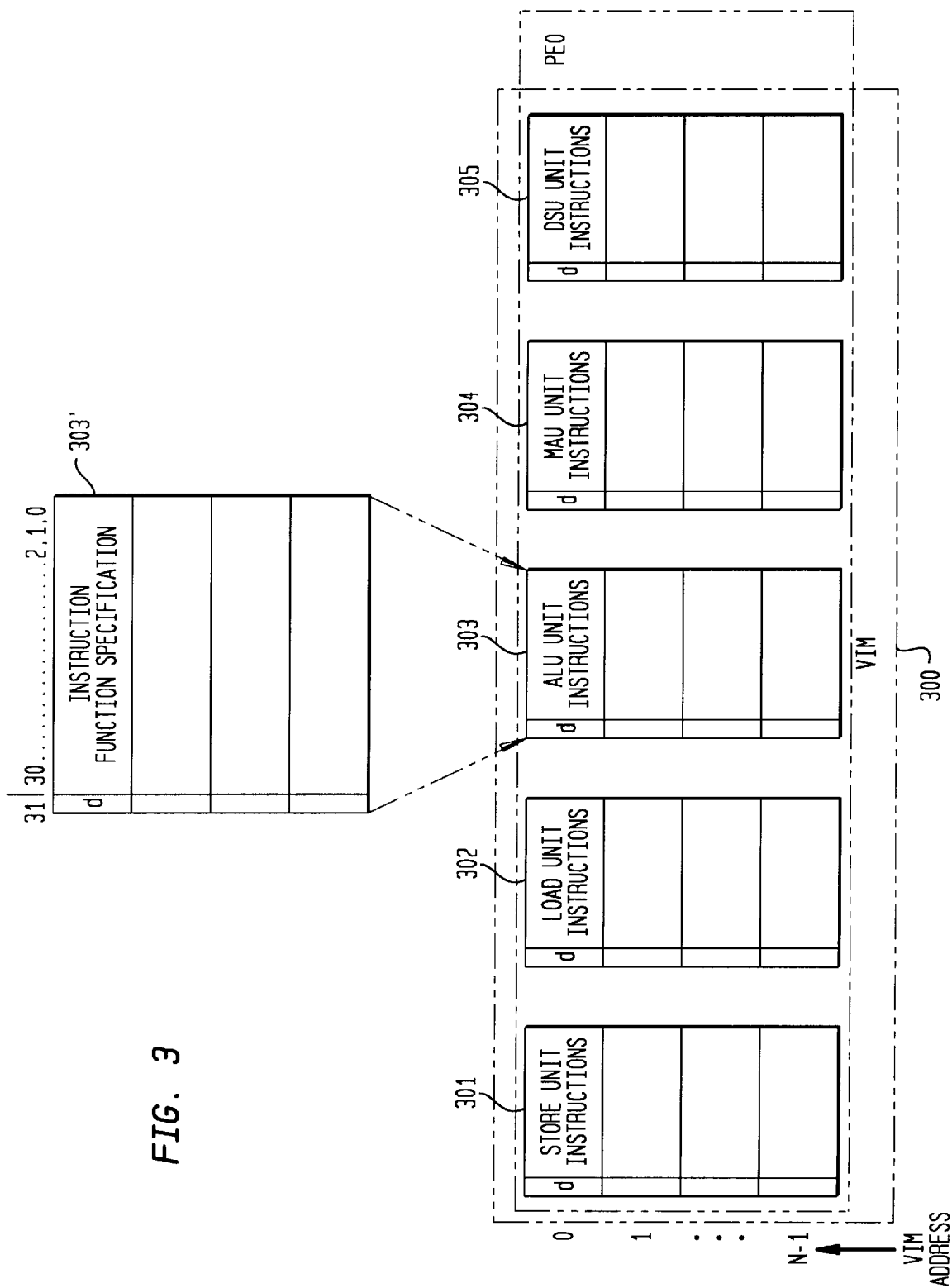
FIG. 3 illustrates a five slot iVLIW with an expanded view of the ALU slot.

FIG. 2 shows a basic iVLIW data path arrangement 200 by which a fetched instruction is stored in an Instruction Register 20 which is connected to the VIM Load and Store Control function 22. The VIM Load and Store Control function provides the interface signals to VIM 24. The VIM 24 corresponds to VIM 106, with each VIM 106 of FIG. 1 having associated registers and controls, such as those shown in FIG. 2. The output of the VIM 24 is pipelined to the iVLIW register 26. FIG. 3 illustrates a Five Slot iVLIW VIM 300 with N entries, 0,1 . . . N−1. Each VIM 300 addressed location includes storage space for Store, Load, ALU, MAU and DSU instructions 301–305. An expanded ALU slot view 303' shows a 32-bit storage space with bit-31 "d" highlighted. The use of the instruction bits in VIM storage will be discussed in greater detail below.

iVLIW instructions can be loaded into an array of PE VIMs collectively, or, by using special instructions to mask a PE or PEs, each PE VIM can be loaded individually. The iVLIW instructions in VIM are accessed for execution through the Execute VLIW (XV) instruction, which, when executed as a single instruction, causes the simultaneous execution of the simplex instructions located at the VIM memory address. An XV instruction can cause the simultaneous execution of:
1. all of the simplex instructions located in an individual SP's or PE's VIM address, or
2. all instructions located in all PEs at the same relative VIM address, or
3. all instructions located at a subset or group of all PEs at the same relative VIM address.

Only two control instructions are necessary to load/modify iVLIW memories, and to execute iVLIW instructions. They are:
1. Load/Modify VLIW Memory Address (LV) illustrated in FIG. 4A, and
2. Execute VLIW (XV) illustrated in FIG. 4B.

The LV instruction 400 shown in FIG. 4A is for 32 bit encoding as shown in encoding block 410 and has the presently preferred syntax/operation shown in syntax/operation block 420 as described further below. The LV instruction 400 is used to load and/or disable individual instruction slots of the specified SP or PE VLIW Memory (VIM). The VIM address is computed as the sum of a base VIM address register Vb (V0 or V1) plus an unsigned 8-bit offset VIMOFFS shown in bits 0–7, the block of bits 411, of encoding block 410 in FIG. 4A. The VIM address must be in the valid range for the hardware configuration otherwise the operation of this instruction in undefined.

Any combination of individual instruction slots may be disabled via the disable slot parameter 'd={SLAMD}', where S=Store Unit (SU), L=Load Unit (LU), A=Arithmetic Logic Unit (ALU), M=Multiply-Accumulate Unit (MAU) and D=Data Select Unit (DSU). A blank 'd=' parameter does not disable any slots. Specified slots are disabled prior to any instructions that are loaded.

The number of instructions to load are specified utilizing an InstrCnt parameter. For the present implementation, valid values are 0–5. The next InstrCnt instructions following LV are loaded into the specified VIM. The Unit Affecting Flags (UAF) parameter 'F=[AMD]' selects which arithmetic instruction slot (A=ALU, M=MAU, D=DSU) is allowed to set condition flags for the specified VIM when it is executed. A blank 'F=' selects the ALU instruction slot. During processing of the LV instruction no arithmetic flags are affected and the number of cycles is one plus the number of instructions loaded.

The XV instruction 425 shown in FIG. 4B is also for 32 bit encoding as shown in encoding block 430 and has the presently preferred syntax/operation shown in syntax/operation block 435 as described further below. The XV instruction 425 is used to execute individual instruction slots of the specified SP or PE VLIW Memory (VIM). The VIM address is computed as the sum of a base VIM address register Vb (V0 or V1) plus an unsigned 8-bit offset VIMOFFS shown in bits 0–7, the block of bits 431, of encoding block 430 of FIG. 4B. The VIM address must be in the valid range for the hardware configuration otherwise the operation of this instruction is undefined.

Any combination of individual instruction slots may be executed via the execute slot parameter 'E={SLAMD}', where S=Store Unit (SU), L=Load Unit (LU), A=Arithmetic Logic Unit (ALU), M=Multiply-Accumulate Unit (MAU), D=Data Select Unit (DSU). A blank 'E=' parameter does not execute any slots. The Unit Affecting Flags (UAF) parameter 'F=[AMDN]' overrides the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified by the LV instruction. A blank 'F=' selects the UAF specified when the VLIW was loaded.

Condition flags are set by the individual simplex instruction in the slot specified by the setting of the 'F=' parameter from the original LV instruction or as overridden by an 'F=[AMD]' parameter in the XV instruction. Condition flags are not affected when 'F=N'. Operation occurs in one cycle. Pipeline considerations must be taken into account based upon the individual simplex instructions in each of the slots that are executed. Descriptions of individual fields in these iVLIW instructions are shown in FIGS. 4C and 4D. FIGS. 4C and 4D show Instruction Field Definitions 440 tabulated by Name 442, number of bits 444 and description values 446. FIGS. 4E and 4F illustrate a presently preferred ADD instruction and slot storage for three synchronous MIMD iVLIWs in a 2×2 ManArray configuration, respectively.

The ADD instruction 450 shown in FIG. 4E is again for 32 bit encoding as shown in encoding block 455 and has the presently preferred syntax/operation shown in syntax/operation block 460 as described further below. ADD instruction 450 is used to store the sum of source registers $R_x$ and $R_y$ in target register $R_t$. Arithmetic scalar flags are affected on least significant operation where N=MSB of resulting sum, Z=1 if result is zero, and is otherwise 0, V=1 if an overflow occurs, and is otherwise 0, and C=1 if a carry occurs, and is otherwise 0. The v bit is meaningful for signed operations, and the C bit is meaningful for unsigned operations. The number of cycles is one.

Individual, Group, and "Synchronous MIMD" PE iVLIW Operations

The LV and XV instructions may be used to load, modify, disable, or execute iVLIW instructions in individual PEs or PE groups defined by the programmer. To do this, individual PEs are enabled or disabled by an instruction which modifies a Control Register located in each PE which, among other things, enables or disables each PE. To load and operate an individual PE or a group of PEs, the control registers are modified to enable individual PE(s), and to disable all others. Normal iVLIW instructions will then operate only on PEs that are enabled.

Figure 5:
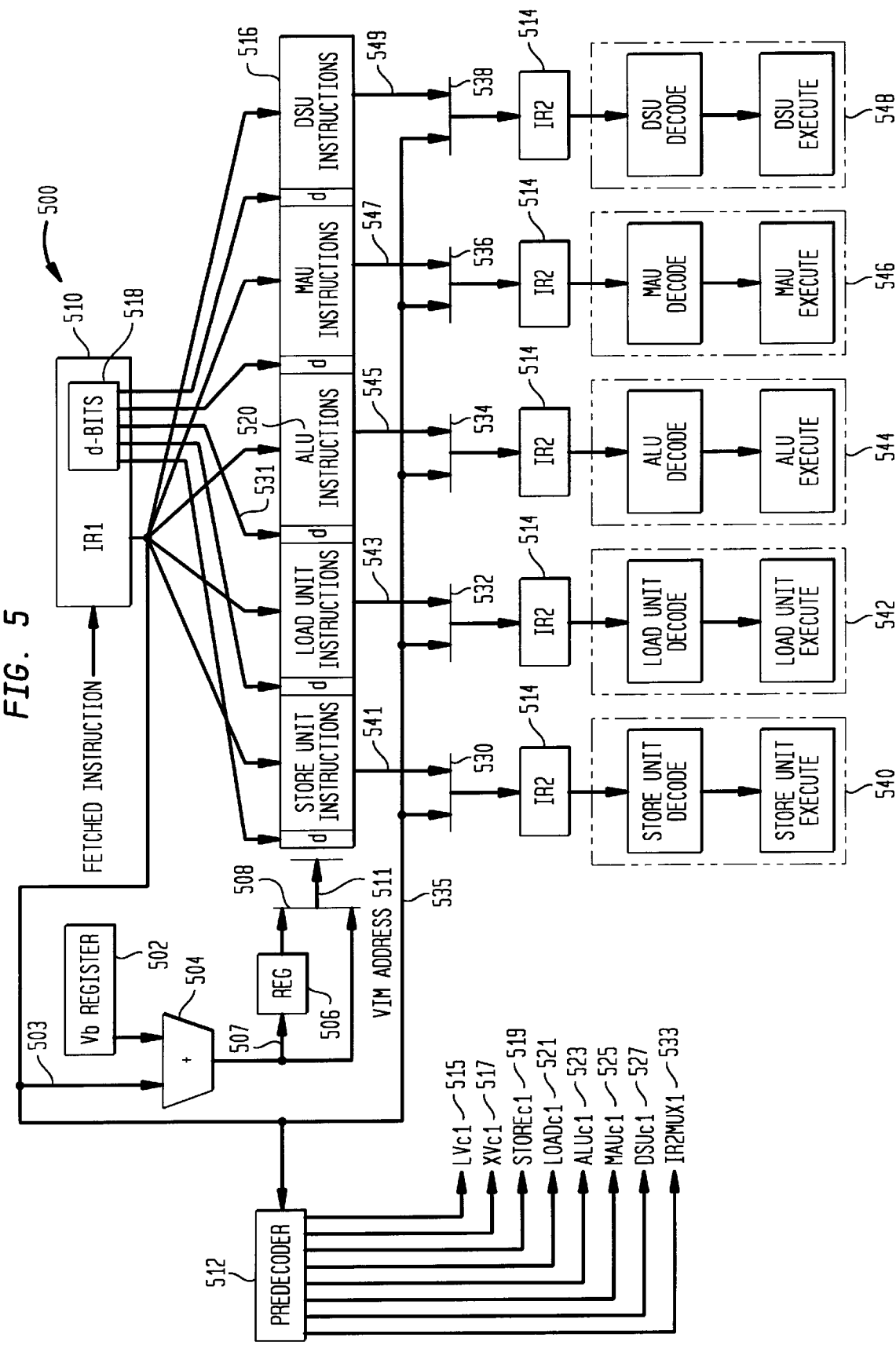
FIG. 5 illustrates an iVLIW load and fetch pipeline in accordance with the present invention.

Referring to FIG. 5, aspects of the iVLIW load and fetch pipeline are described in connection with an iVLIW system 500. Among its other aspects, FIG. 5 shows a selection mechanism for allowing selection of instructions out of VIM memory. A fetched instruction is loaded into a first instruction register (IR1) 510. Register 510 corresponds generally with instruction register 20 of FIG. 2. The output of IR1 is pre-decoded in predecoder or precode function 512 early in the pipeline cycle prior to loading the second instruction register (IR2) 514. When the instruction in IR1 is a Load iVLIW instruction (LV) with a non-zero instruction count, the pre-decoder 512 generates an LVc1 control signal 515, which is used to set up the LV operation cycle, and the VIM address 511 is calculated by use of the specified Vb register 502 added by an adder 504 to an offset value included in the LV instruction via path 503. The resulting VIM address 511 is stored in register 506 and passed through multiplexer 508 to address the VIM 516. VIM 516 corresponds generally to VIM 106 of FIG. 1. Register 506 is required to hold the VIM address 507 during the LV operations. The VIM address 511 and LV control state allow the loading of the instructions received after the LV instruction into the VIM 516. At the end of the cycle in which the LV was received, the disable bits 10–17, shown in FIG. 4A, are loaded into the d-bits register 518 for use when loading instructions into the VIM 516. Upon receipt of the next instruction in IR1 510, which is to be loaded into VIM 516, the appropriate control signal is generated depending upon the instruction type, Storec1 519, Loadc1 521, ALUc1 523, MAUc1 525, or DSUc1 527. The pre-decode function 512 is preferably provided based upon a simple decoding of the Group bits (bits 30 and 31) which define the instruction type shown in FIGS. 4A, B and E and the Unit field bits (bits 27 and 28 which specify the execution unit type) shown in FIGS. 4D and 4E. By using this pre-decode step, the instruction in IR1 510 can be loaded into VIM 516 in the proper functional unit position. For example, for the ADD instruction of FIG. 4E, included in the LV list of instructions, when this instruction is received into IR1 510 it can be determined by the pre-decode function 512 that this instruction should be loaded into the ALU Instruction slot 520 in VIM 516. In addition, the appropriate d-bit 531 for that functional slot position is loaded into bit-31 of that slot. The loaded d-bit occupies one of the group code bit positions from the original instruction.

Upon receipt of an XV instruction in IR1 510, the VIM address 511 is calculated by use of the specified Vb register 502 added by adder 504 to the offset value included in the XV instruction via path 503. The resulting VIM Address 507 is passed through multiplexer 508 to address the VIM. The iVLIW at the specified address is read out of the VIM 516 and passes through the multiplexers 530, 532, 534, 536, and 538, to the IR2 registers 514. As an alternative to minimize the read VIM access timing critical path, the output of VIM 516 can be latched into a register whose output is passed through a multiplexer prior to the decode state logic.

For execution of the XV instruction, the IR2MUX1 control signal 533 in conjunction with the pre-decode XVc1 control signal 517 cause all the IR2 multiplexers, 530, 532, 534, 536, and 538, to select the VIM output paths, 541, 543, 545, 547, and 549. At this point, the five individual decode and execution stages of the pipeline, 540, 542, 544, 546, and 548, are completed in synchrony providing the iVLIW parallel execution performance. To allow a single 32-bit instruction to execute by itself in the PE or SP, the bypass VIM path 535 is shown. For example, when a simplex ADD instruction is received into IR1 510 for parallel array execution, the pre-decode function 512 generates the IR2MUX1 533 control signal, which in conjunction with the instruction type pre-decode signal, 523 in the case of an ADD, and lack of an XV 517 or LV 515 active control signal, causes the ALU multiplexer 534 to select the bypass path 535.

Figure 6:
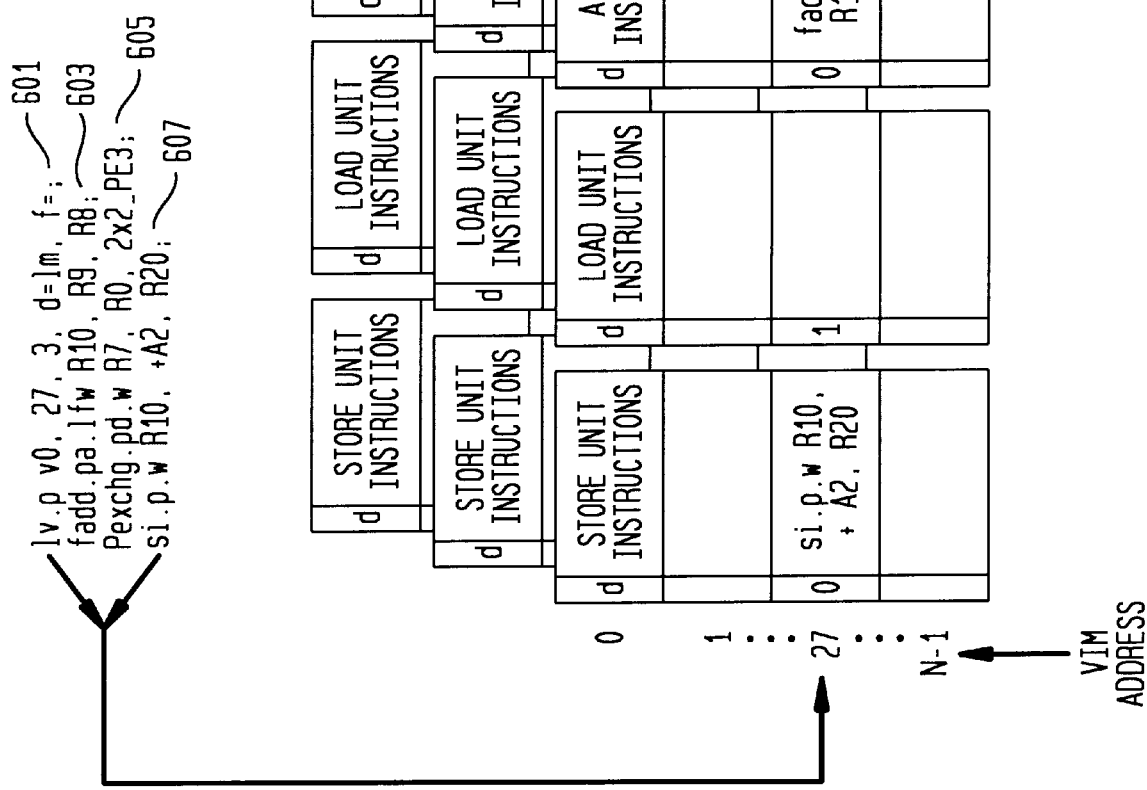
FIG. 6 illustrates aspects of SIMD iVLIW Array processing.

Since a ManArray can be configured with a varying number of PEs, FIG. 6 shows an exemplary SIMD iVLIW usage of an iVLIW system such as the system 500 shown in FIG. 5. In FIG. 6, there are J+1 PEs as indicated by the PE numbering PE0 to PEJ. A portion of LV code is shown in FIG. 6 indicating that three instructions are to be loaded at VIM address 27 with the Load Unit and MAU instruction slots being disabled. This loading operation is determined from the LV instruction 601 based upon the syntax shown in FIG. 4A. Assuming all PEs are masked on, then the indicated three instructions 603, 605, and 607, will be loaded at VIM address 27 in each of the J+1 PEs in the array. The result of this loading is indicated in FIG. 6 by showing the instructions stored in their appropriate execution slot in the VIMs, instruction 603 in the ALU slot, instruction 605 in the DSU slot, and instruction 607 in the Store Unit slot.

Figure 7:
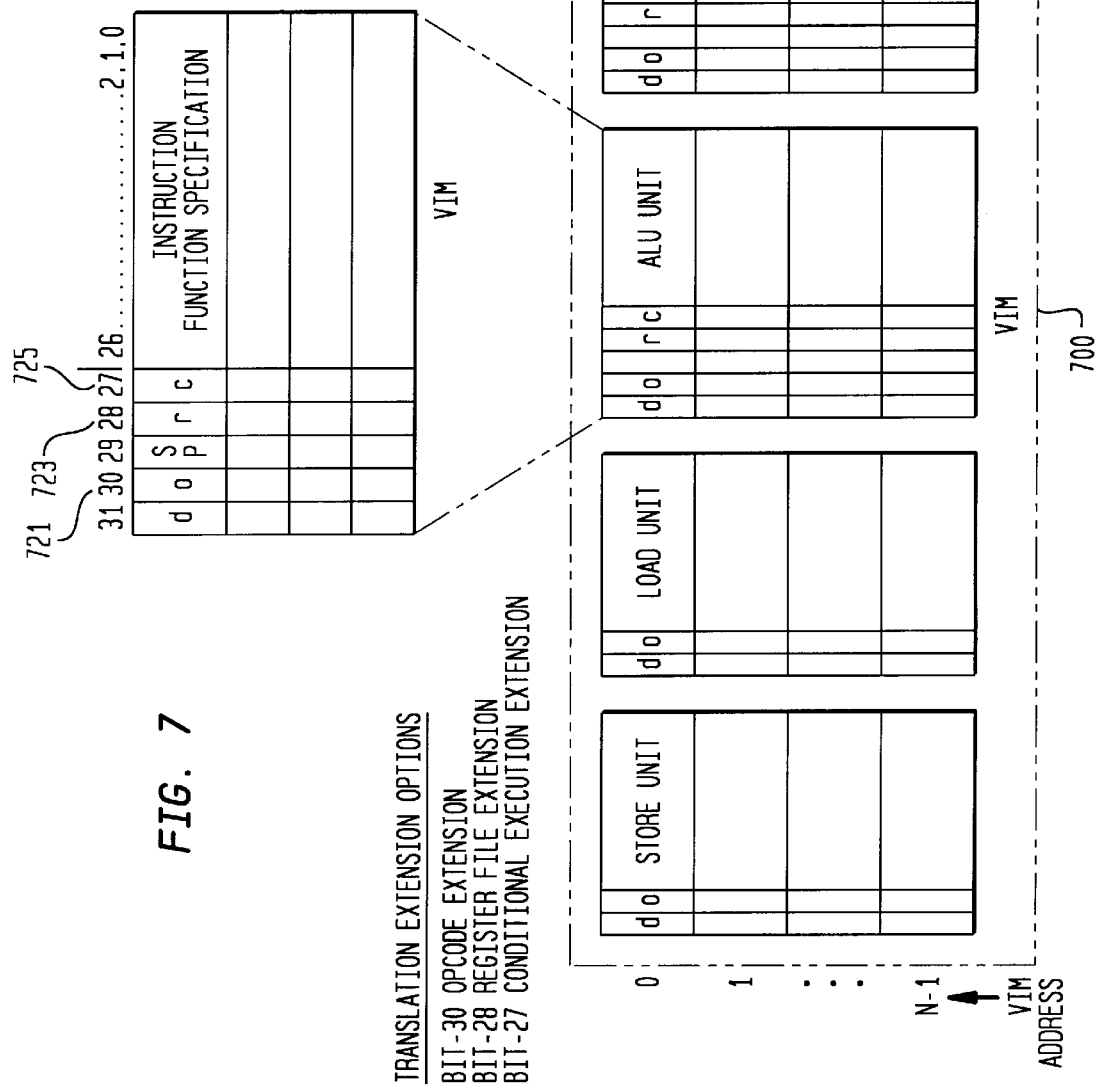
FIG. 7 illustrates an iVLIW translation extension.

It is noted, that in the previous discussion, covered by FIGS. 3, 5, and 6, the pre-decode function allows the multiple bit-31 positions of the VIM slot fields to be written with the stored d-bits 518 shown in FIG. 5, that were generated from the LV instruction that initiated the VIM loading sequence. It is further noted that the unit field, bits 27 and 28, in the arithmetic instructions, see, for example, FIG. 4E, is needed to determine which VIM slot an arithmetic instruction is to be loaded into. Consequently, since the instruction in IR1 can be specifically associated with the execution unit slot in VIM by use of the pre-decode function, the Group bits and Unit field bits do not need to be stored in the VIM and can be used for other purposes as demonstrated by use of the single d-bit in the previous discussion. The specific bit positions in the VIM slots are shown in VIM 700 in FIG. 7, wherein one of the instruction group bits, bit 30 of FIG. 4E, and the instruction Unit field bits, bits 27 and 28 are replaced in VIM 700 by the Translation Extension Option bits "o" for Opcode Extensions bit-30 labeled 721 of FIG. 7, "r" for Register File Extensions bit-28 labeled 723, and "c" for Conditional Execution Extensions bit-27 labeled 725. These additional bits are separately stored in a miscellaneous register 850 shown in FIG. 8A, that the programmer can load to or store from. These bits provide extended capabilities that could not be provided due to lack of instruction encoding bits in a 32-bit instruction format. For the opcode extension bit "o", it is possible to map one set of instructions into a new set of instructions. For the register extension bit "r", it is possible to double the register file space and have two banks of registers providing either additional register space or to act as a fast context switching mechanism allowing two register banks to be split between two contexts. For the condition execution extension bit "c", it is possible to specify two different sets of conditions or specify a different conditional execution functionality under programmer control.

Figure 8A:
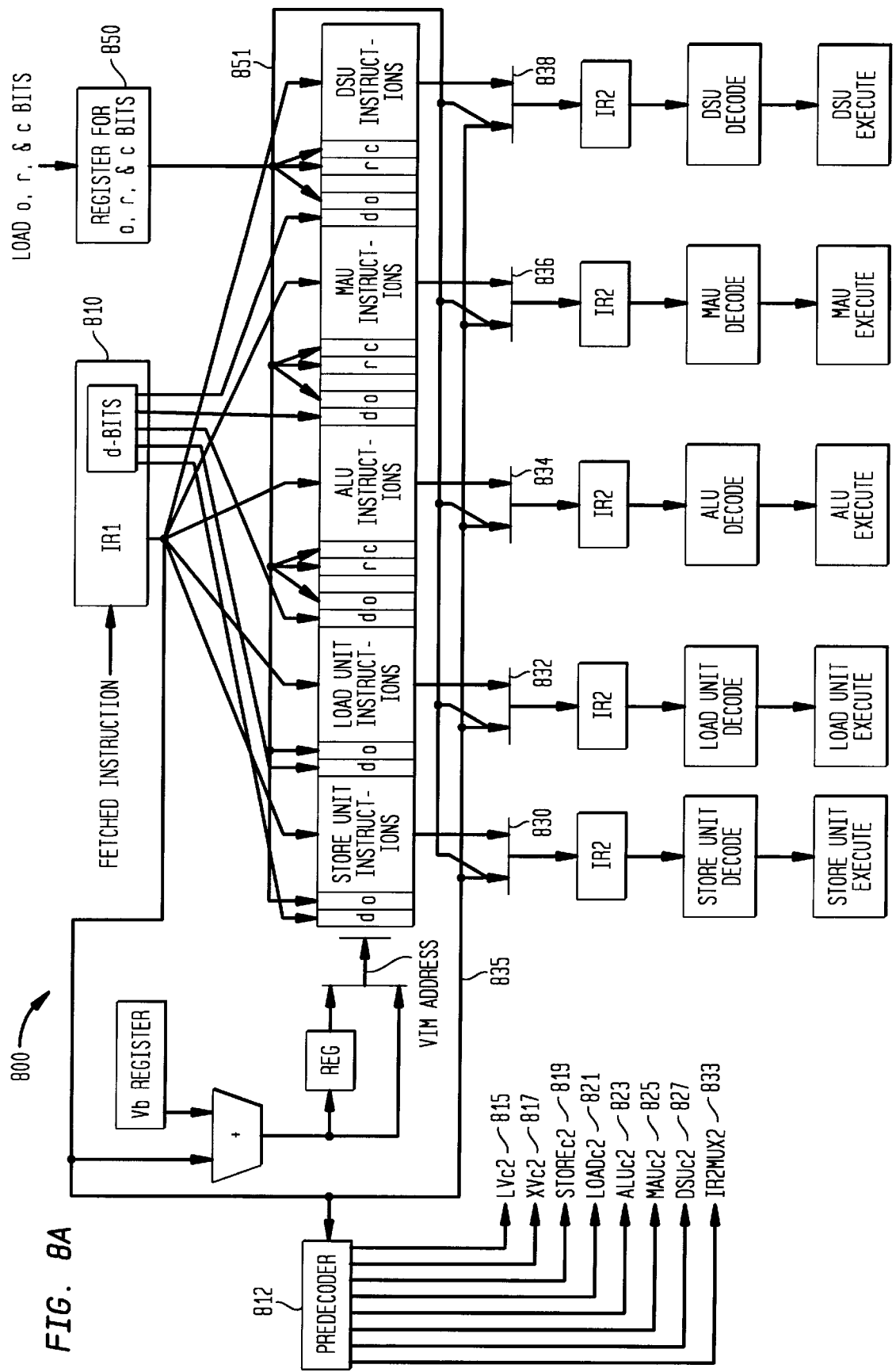
FIG. 8A illustrates an iVLIW translation extension load and fetch pipeline.

FIG. 8A depicts an iVLIW system 800 which illustrates aspects of the iVLIW translation extension load and fetch pipeline showing the addition of the o,r, and c bits register 850 and the set of pre-decode control signals 815, 817, 819, 821, 823, 825, 827, and 833. It is noted that other uses of these freed up bits are possible. For example, all three bits could be used for register file extension providing either individual control to the three operand instructions or providing up to eight banks of 32×32 registers.

To allow a single 32-bit instruction to execute by itself in the iVLIW PE or iVLIW SP, the bypass VIM path 835 is shown in FIG. 8A. For example, when a simplex ADD instruction is received into IR1 810 for parallel array execution, the pre-decode function 812 generates the IR2MUX2 833 control signal, which in conjunction with the instruction type pre-decode signal, 823 in the case of an ADD, and lack of an XV 817 or LV 815 active control signal, causes the ALU multiplexer 834 to select the bypass path 835. Since as described herein, the bypass operation is to occur during a full stage of the pipeline, it is possible to replace the group bits and the unit field bits in the bypassed instructions as they enter the IR2 latch stage. This is indicated in FIG. 8A by the "o, r, and c" bits signal path 851 being used to replace the appropriate bit positions at the input to the multiplexers 830, 832, 834, 836, and 838.

Figure 8B:
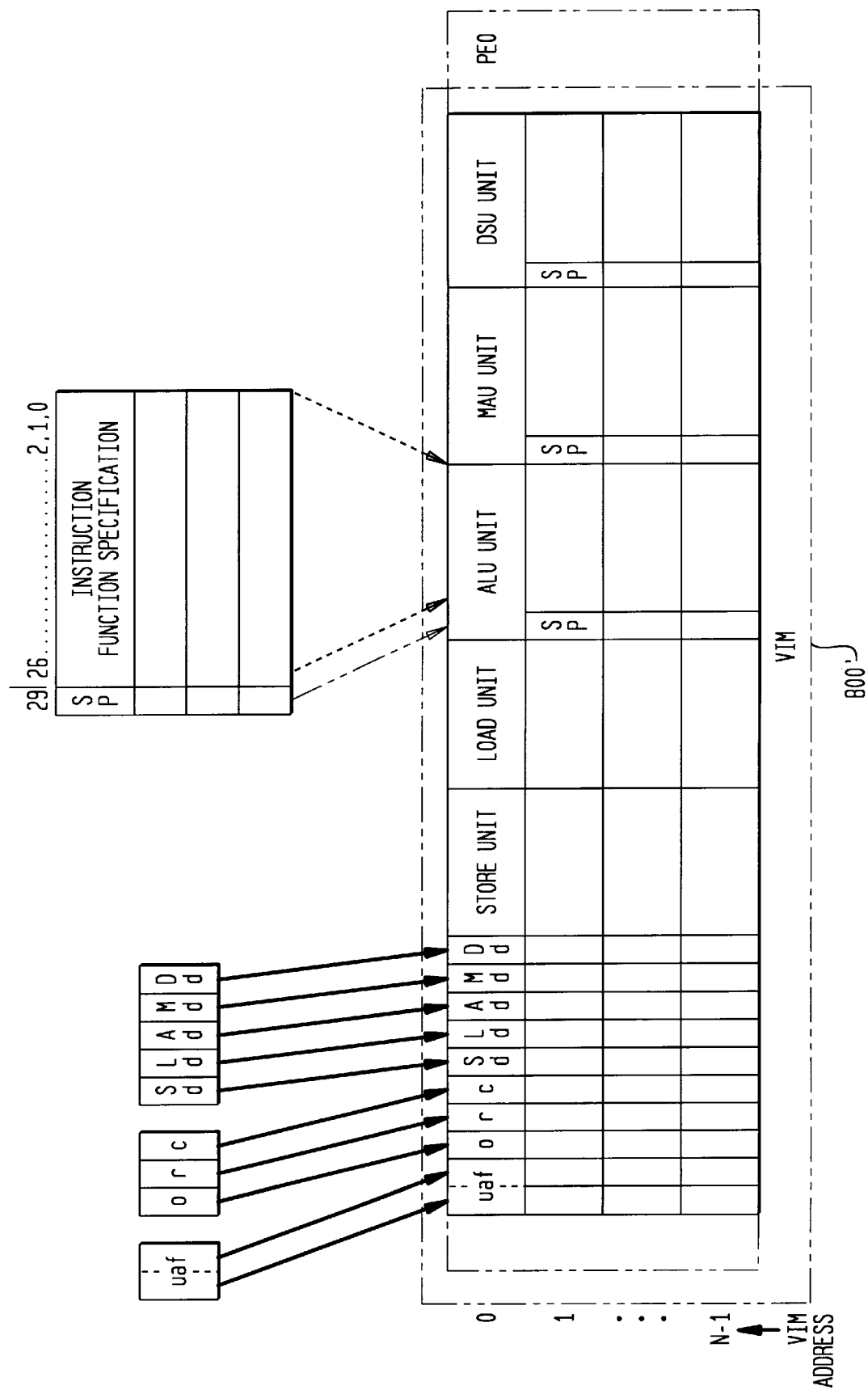
FIG. 8B illustrates an alternative format for VIM iVLIW storage.

It is noted that alternative formats for VIM iVLIW storage are possible and may be preferable depending upon technology and design considerations. For example, FIG. 8B depicts an alternative form VIM 800' from that shown in FIGS. 7 and 8A. The d-bits per execution slot are grouped together with the additional bits "o, r, c and uaf" bits. These ten bits are grouped separately from the execution unit function bits defined in bits 0–26,29 per each slot. The unit affecting field (uaf) bits 22 and 23 of FIG. 4A from the LV instruction are required to be stored at a single iVLIW VIM address since the "uaf" bits pertain to which arithmetic unit affects the flags at the time of execution. Other storage formats are possible, for example, storing the d-bits with the function bits and the bits associated with the whole iVLIW, such as the "uaf" bits, stored separately. It is also noted that for a k-slot iVLIW, k*32-bits are not necessarily required to be stored in VIM. Due to the pre-decode function, not only can additional bits be stored in the k*32-bit space assumed to be required to store the k 32-bit instructions, but the k*32-bit space can be reduced if full utilization of the bits is not required. This is shown in FIG. 8B, where the total number of storage bits per VIM address is given by five times the 28-bits required per execution unit slot position (0–26 and 29) plus five d-bits, plus three "o, r, and c" bits plus 2 "uaf" bits for a total of 150 bits per iVLIW address which is ten less than the 5*32=160-bits that might be assumed to be required. Increased functionality while reducing VIM memory space results. In general, additional information may be stored in the VIM individually per execution unit or as separate individual bits which affect control over the iVLIW stored at that VIM address. For example, sixteen additional load immediate bits can be stored in a separate "constant" register and loaded in a VIM address to extend the Load Unit's capacity to load 32 bits of immediate data. To accomplish this extension, the VIM data width must be expanded appropriately. Also the size of the stored iVLIWs is decoupled from being a multiple of the instruction size thereby allowing the stored iVLIW to be greater than or less than the k*32-bits for a k instruction iVLIW, depending upon requirements.

Figure 9:
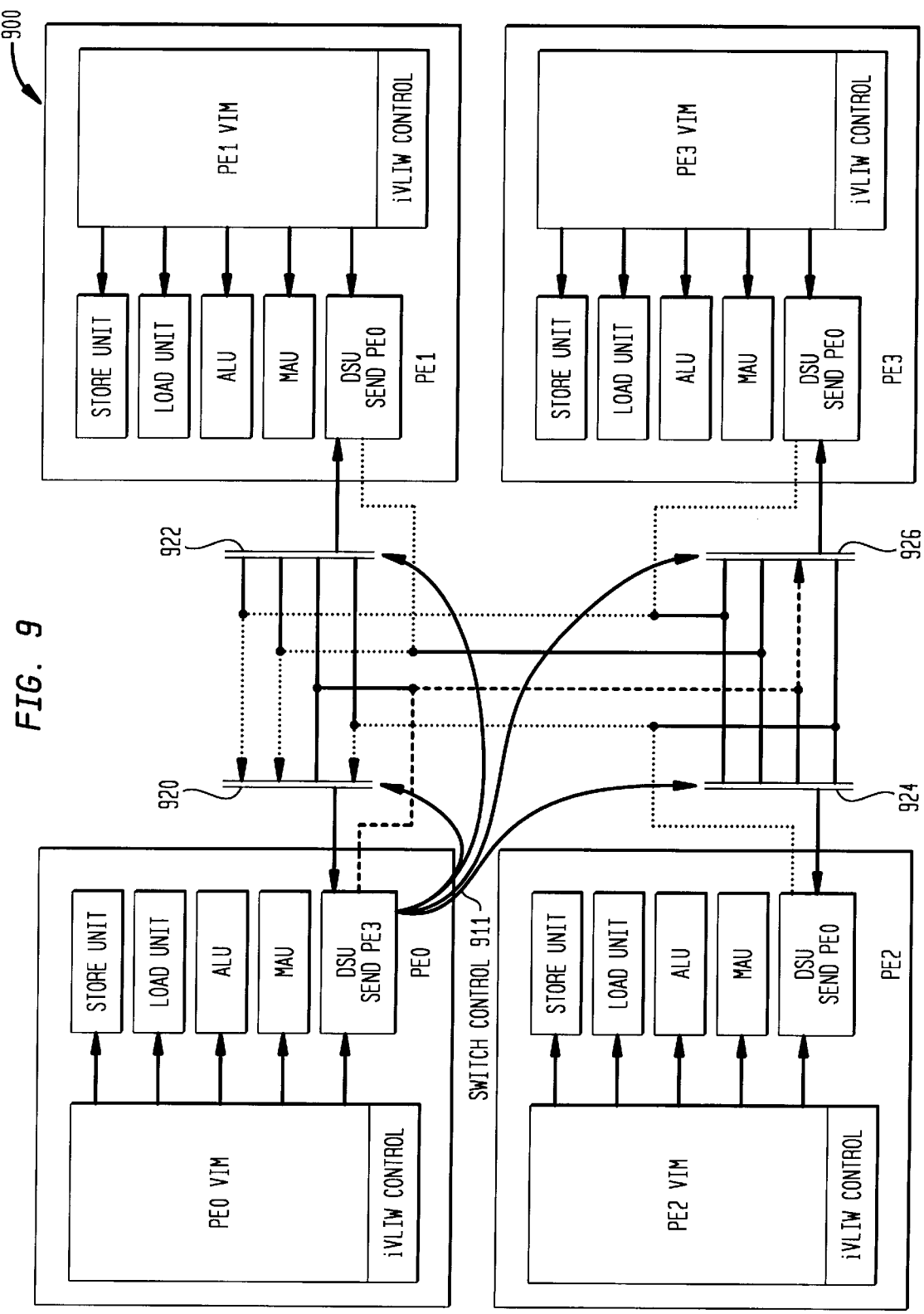
FIG. 9 illustrates a send model cluster switch control and an exemplary hazard for SMIMD communications using the send model.
Figure 10:
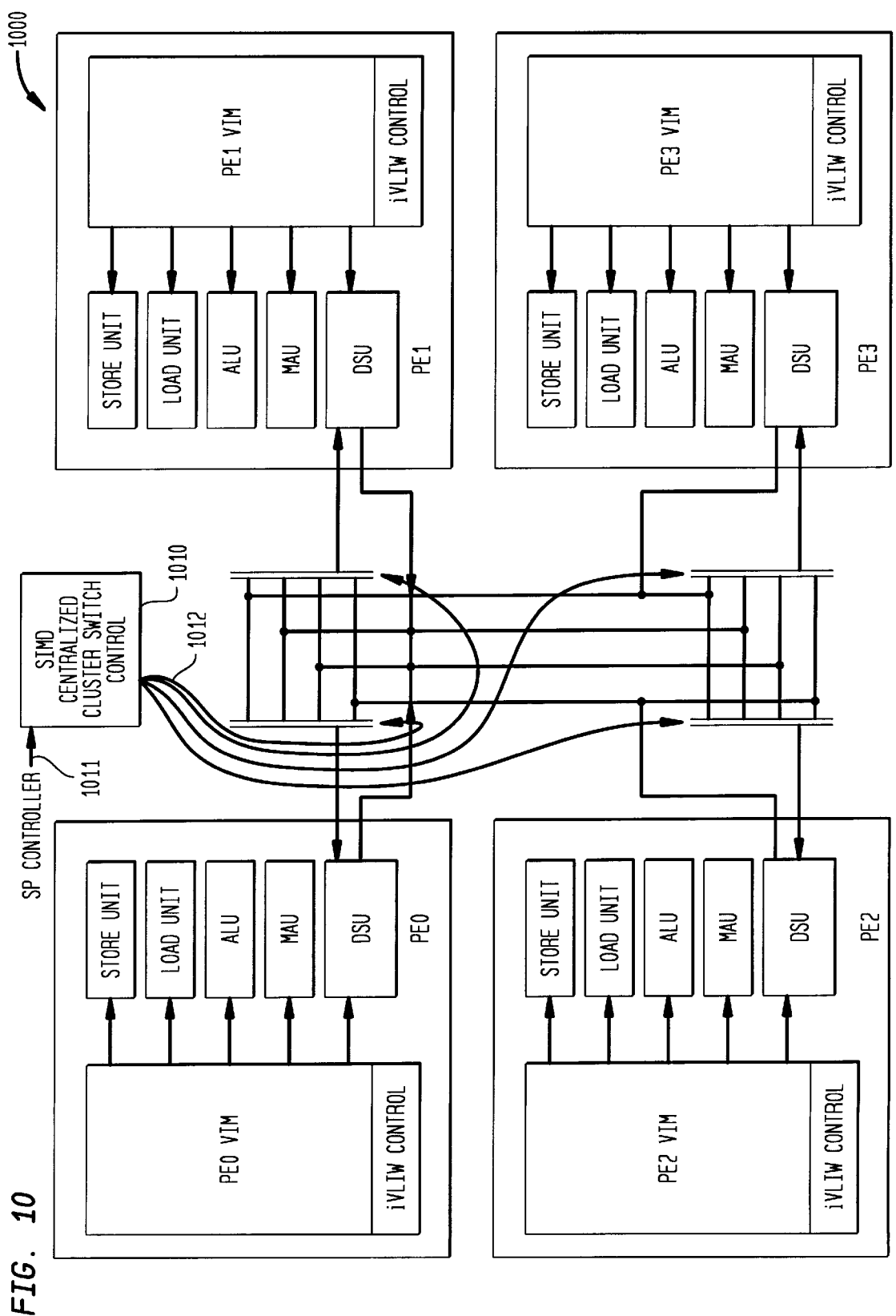
FIG. 10 illustrates a send model with a centralized cluster switch control.

In a processor consisting of an SP controller 102 as in FIG. 1 but not shown for clarity in FIG. 9 or FIG. 10 and an array of PEs, such as processor 900 of FIG. 9, or processor 1000 of FIG. 10, a problem may be encountered when implementing SMIMD operations when dealing with inter-PE communications. The typical SIMD mode of communications specifies all PEs execute the same inter-PE communication instruction. This SIMD inter-PE instruction, being the same in each PE, requires a common controlling mechanism to ensure compliance with the common operation defined between the PEs. Typically, a Send Model is used where a single instruction, such as SEND-WEST, is dispatched to all PEs in the array. The SIMD inter-PE communication instruction causes a coordinated control of the network interface between the PEs to allow each PE to send data to the PE topologically defined by the inter-PE instruction. This single SIMD instruction can be interpreted and the network interface 911 can be controlled by a single PE as shown in FIG. 9 since all PEs receive the same instruction. It is noted that the ManArray 2×2 cluster switch, shown in FIG. 9, is made up of four 4-to-1 multiplexers 920, 922, 924, and 926, for the interface Input/Output (I/O) buses between the DSU. These buses can be 8, 9, 16, 32, 64, or other number of bit, bit buses without restriction. The control of a single 4-to-1 multiplexer requires only two bits of control to select one out of four of the possible paths. This can be extended for larger clusters of PEs as necessary with larger multiplexers. It is also possible in a SIMD system to have a centralized control for the interface network between PEs as shown in FIG. 10. In FIG. 10, a centralized controller 1010 receives the same dispatched inter-PE communication instruction 1011 from the SP controller as do the other PEs in the network. This mechanism allows the network connections to be changed on a cycle-by-cycle basis. Two attributes of the SIMD Send Model are a common instruction to all PEs and the specification of both sender and receiver. In the SIMD mode, this approach is not a problem.

In attempting to extend the Send Model into the SMIMD mode, other problems may occur. One such problem is that in SMIMD mode it is possible for multiple processing elements to all attempt to send data to a single PE, since each PE can receive a different inter-PE communication instruction. The two attributes of the SIMD Send Model break down immediately, namely having a common inter-PE instruction and specifying both source and target, or, in other words, both sender and receiver. It is a communications hazard to have more than one PE target the same PE in a SIMD model with single cycle communications. This communication hazard is shown in FIG. 9 wherein the DSUs for PEs 1, 2 and 3 are to send data to PE0 while PE0 is to send data to PE3. The three data inputs to PE0 cannot be received. In other systems, the resolution of this type of problem many times causes the insertion of interface buffers and priority control logic to delay one or more of the conflicting paths. This violates the inherently synchronous nature of SMIMD processing since the scheduling of the single cycle communications operations must be done during the programming of the iVLIW instructions to be executed in the PEs. To avoid the communication hazards without violating the synchronous MIMD requirements, a Receive Model is advantageously employed. The single point of network control, be it located in a single PE or in a centralized control mechanism, that is facilitated by the Send Model is replaced in the Receive Model with distributed network interface control. Each PE controls its own receive port. The Receive Model specifies the receive path through the network interface. In the case of the ManArray network, each PE controls its own multiplexer input path of the cluster switch.

Figure 11:
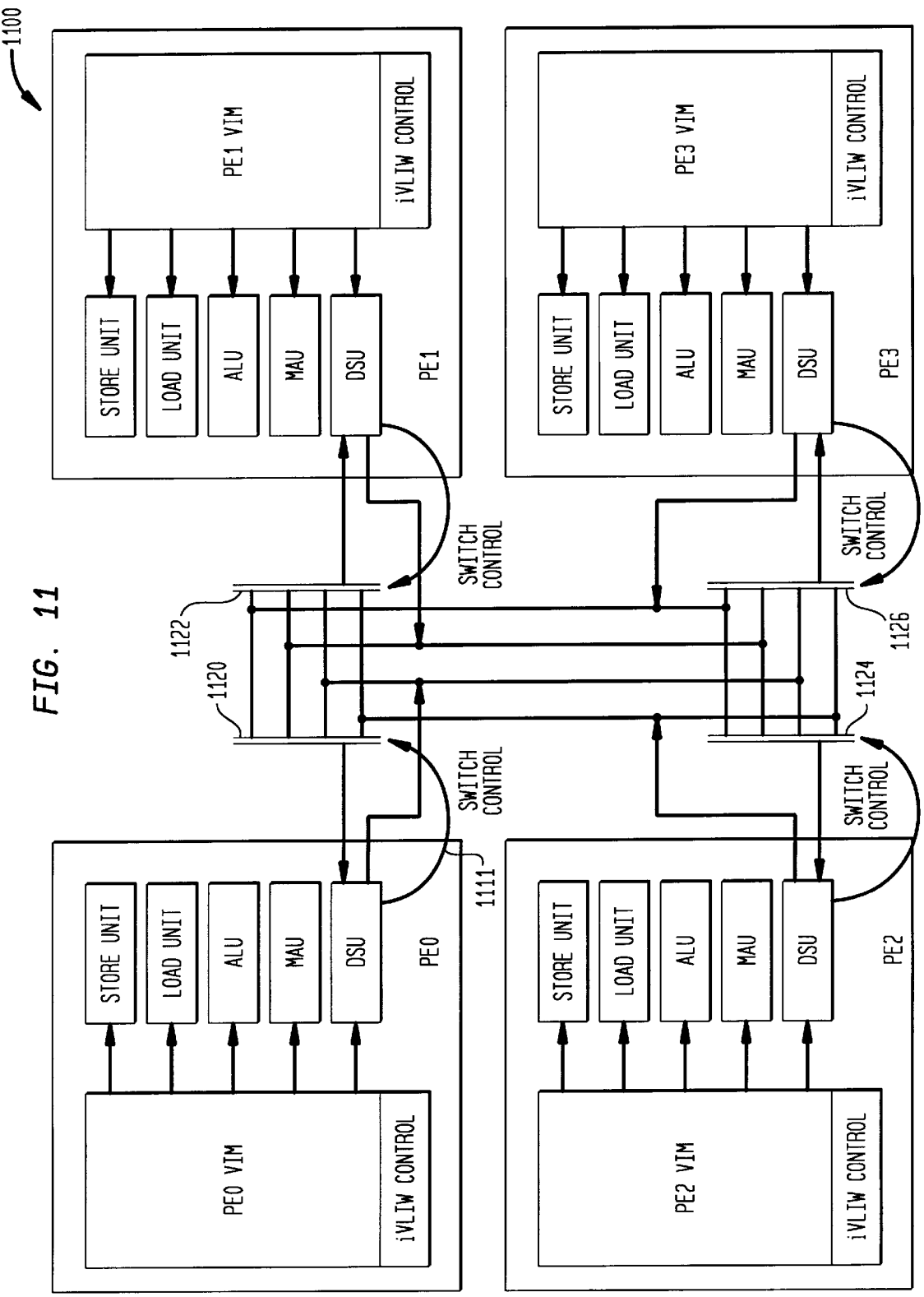
FIG. 11 illustrates a receive model cluster switch control used to avoid communications hazards in the SMIMD mode of operation.

This arrangement is shown for a 2×2 array processor 1100 in FIG. 11 where each PE has its own control of its input multiplexer, 1120, 1122, 1124 or 1126, respectively. For example, PE0 has control signals 1111 for controlling its input multiplexer 1120. The Receive Model also requires that data be made available on the PEs output port to the interface network without target PE specification. Consequently, for any meaningful communication to occur between processing elements using the Receive Model, the PEs must be programmed to cooperate in the receiving of the data that is made available. Using Synchronous MIMD, this cooperation is guaranteed to occur if the cooperating instructions exist in the same iVLIW location. With this location of instructions when an XV instruction is executed, the cooperating PEs execute the proper inter-PE communications instructions to cause data movement between any two or more PEs. In general, in an array of PEs, there can be multiple groups of PEs. In each such a group, a one or more PEs can receive data from another PE while in another group one or more PEs can receive data from a different PE. A group can vary in size from two PEs to the whole array of PEs. While FIG. 11 does not show an SP, such as the SP controller 102 of FIG. 1, for ease and clarity of illustration, such a controller will preferably be included although it will be recognized that SP functionality can be merged with a PE such as PE0 as taught in U.S. Provisional Application Ser. No. 60/077,457 previously incorporated by reference, or SP functionality could be added to all of the PEs although such increased functionality would be relatively costly.

FIG. 4F shows the definition 470 of three Synchronous-MIMD iVLIWs in a 2×2 ManArray configuration. The top section 480 gives a descriptive view of the operations. The bottom section 490 gives the corresponding instruction mnemonics which are loaded in the LU, MAU, ALU, DSU and SU, respectively. Each iVLIW contains four rows between thick black lines, one for each PE. The leftmost column of the figure shows the address where the iVLIW is loaded in PE iVLIW Instruction Memory (VIM). The next column shows the PE number. Each iVLIW contains one row for each PE, showing the instructions which are loaded into that PE's VIM entry. The remaining columns list the instruction for each of the five execution units: Load Unit (LU), Multiply-Accumulate Unit (MAU), Arithmetic Logic Unit (ALU), Data Select Unit (DSU), and Store Unit (SU).

For example, VIM entry number 29 in PE2 495 is loaded with the four instructions li.p.w R3,A1+, A7, fmpy.pm.1fw R5, R2, R31, fadd.pa.1fw R9, R7, R5, and pexchg.pd.w R8, R0 2×2_PE3. These instructions are those found in the next to last row of FIG. 4F. That same VIM entry (29) contains different instructions in PEs 0, 1, and 3, as can be seen by the rows corresponding to these PEs on VIM entry 29, for PE0 491, PE2 493, and PE3 497.

The following example 1—1 shows the sequence of instructions which load the PE VIM memories as defined in FIG. 4F. Note that PE Masking is used in order to load different instructions into different PE VIMs at the same address.

EXAMPLE 1—1

Loading Synchronous MIMD iVLIWs into PE VIMs

```
! first load in instructions common to PEs 1,2,3 lim.s.h0 SCR1, 1                    ! mask off PE0 in order to load in 1,2,3
lim.s.h0 VAR, 0                     ! load VIM base address reg v0 with zero
lv.p v0, 27, 2, d=, f=              ! load VIM entry v0 + 27 (=27) with the
                                    ! next two instructions; disable no
                                    ! instrs; default flag setting to ALU
    li.p.w R1, A1+, A7                  ! load instruction into LU
    fmpy.pm.1fw R6, R3, R31             ! mpy instruction into MAU
lv.p v0, 28, 2, d=, f=              ! load VIM entry v0 + 28 (=28) with the
                                    ! next two instructions; disable no
                                    ! instrs; default flag setting to ALU
    li.p.w R2, A1+, A7                  ! load instruction into LU
    fmpy.pm.1fw R4, R1, R31             ! mpy instruction into MAU
lv.p v0, 29, 2, d=, f=              ! load VIM entry v0 + 29 (=29) with the
                                    ! next two instructions; disable no
                                    ! instrs; default flag setting to ALU
    li.p.w R3, A1+, A7                  ! load instruction into LU
    fmpy.pm.1fw R5, R2, R31             ! mpy instruction into MAU
! now load in instructions unique to PE0 lim.s.h0 SCR1, 14                   ! mask off PEs 1,2,3 to load PE0
nop                                 ! one cycle delay to set mask
lv.p v0, 27, 1, d = lmad, f=        ! load VIM entry v0 + 27 (=27) with the
                                    ! next instruction; disable instrs
                                    ! in LU, MAU, ALU, DSU slots; default
                                    ! flag setting to ALU
    si.p.w R1, A2+, R28                 ! store instruction into SU
lv.p v0, 28, 1, d = lmad, f=        ! load VIM entry v0 + 28 (=28) with the
                                    ! next instruction; disable instrs
                                    ! in LU, MAU, ALU, DSU slots; default
                                    ! flag setting to ALU
    si.p.w R1, A2+, R28                 ! store instruction into SU
lv.p v0, 29, 1, d = lmad, f=        ! load VIM entry v0 + 29 (=29) with the
                                    ! next instruction; disable instrs
                                    ! in LU, MAU, ALU, DSU slots; default
                                    ! flag setting to ALU
```

| | |
|---|---|
| si.p.w R1, A2+, R28 | ! store instruction into SU |
| ! now load in instructions unique to PE1 | |
| | |
| lim.s.h0 SCR1, 13 | ! mask off PEs 0,2,3 to load PE1 |
| nop | ! one cycle delay to set mask |
| lv.p v0, 27, 3, d=, f= | ! load VIM entry v0 + 27 (=27) with the |
| | ! next three instructions; disable no |
| | ! instrs; default flag setting to ALU |
|     fadd.pa.1fw R10, R9, R8 |    ! add instruction into ALU |
|     pexchg.pd.w R7, R0, 2 × 2_PE3 | ! pe comm instruction into DSU |
|     si.p.w R10, +A2, A6 |    ! store instruction into SU |
| lv.p v0, 28, 2, d = s, f= | ! load VIM entry v0 + 28 (=28) with the |
| | ! next two instructions; disable instr |
| | ! in SU slot; default flag setting to ALU |
|     fadd.pa.1fw R9, R7, R4 |    ! add instruction into ALU |
|     pexchg.pd.w R8, R5, 2 × 2_PE2 | ! pe comm instruction into DSU |
| lv.p v0, 29, 3, d=, f= | ! load VIM entry v0 + 29 (=29) with the |
| | ! next three instructions; disable no |
| | ! instrs; default flag setting to ALU |
|     fcmpLE.pa.1fw R10, R0 |    ! compare instruction into ALU |
|     pexchg.pd.w R15, R6, 2 × 2_PE1 | ! pe comm instruction into DSU |
|     t.sii.p.w R0, A2+, 0 |    ! store instruction into SU |
| ! now load in instructions unique to PE2 | |
| | |
| lim.s.h0 SCR1, 11 | ! mask off PEs 0,1,3 to load PE2 |
| nop | ! one cycle delay to set mask |
| lv.p v0, 27, 3, d=, f= | ! load VIM entry v0 + 27 (=27) with the |
| | ! next three instructions; disable no |
| | ! instrs; default flag setting to ALU |
|     fcmpLE.pa.1fw R10, R0 |    ! compare instruction into ALU |
|     pexchg.pd.w R15, R6, 2 × 2_PE2 | ! pe comm instruction into DSU |
|     t.sii.p.w R0, A2+, 0 |    ! store instruction into SU |
| lv.p v0, 28, 3, d=, f= | ! load VIM entry v0 + 28 (=28) with the |
| | ! next three instructions; disable no |
| | ! instrs; default flag setting to ALU |
|     fadd.pa.1fw R10, R9, R8 |    ! add instruction into ALU |
|     pexchg.pd.w R7, R4, 2 × 2_PE1 | ! pe comm instruction into DSU |
|     si.p.w R10, +A2, A6 |    ! store instruction into SU |
| lv.p v0, 29, 2, d = s, f= | ! load VIM entry v0 + 29 (=29) with the |
| | ! next two instructions; disable instr |
| | ! in SU slot; default flag setting to ALU |
|     fadd.pa.1fw R9, R7, R5 |    ! add instruction into ALU |
|     pexchg.pd.w R8, R0, 2 × 2_PE3 | ! pe comm instruction into DSU |
| ! now load in instructions unique to PE3 | |
| | |
| lim.s.h0 SCR1, 7 | ! mask off PEs 0,1,2 to load PE3 |
| nop | ! one cycle delay to set mask |
| lv.p v0, 27, 2, d = s, f= | ! load VIM entry v0 + 27 (=27) with the |
| | ! next two instructions; disable instr |
| | ! in SU slot; default flag setting to ALU |
|     fadd.pa.1fw R9, R7, R6 |    ! add instruction into ALU |
|     pexchg.pd.w R8, R4, 2 × 2_PE2 | ! pe comm instruction into DSU |
| lv.p v0, 28, 2, d = d, f= | ! load VIM entry v0 + 28 (=28) with the |
| | ! next 2 instructions; disable instr in |
| | ! DSU slot; default flag setting to ALU |
|     fcmpLE.pa.1fw R10, R0 |    ! compare instruction into ALU |
|     t.sii.p.w R0, A2+, 0 |    ! store instruction into SU |
| lv.p v0, 29, 3, d=, f= | ! load VIM entry v0 + 29 (=29) with the |
| | ! next three instructions; disable no |
| | ! instrs; default flag setting to ALU |
|     fadd.pa.1fw R10, R9, R8 |    ! add instruction into ALU |
|     pexchg.pd.w R7, R5, 2 × 2_PE1 | ! pe comm instruction into DSU |
|     si.p.w R10, +A2, A6 |    ! store instruction into SU |
| lim.s.h0 SCR1, 0 | ! reset PE mask so all PEs are on |
| nop | ! one cycle delay to set mask |

The following example 1-2 shows the sequence of instructions which execute the PE VIM entries as loaded by the example 1—1 code in FIG. 4F. Note that no PE Masking is necessary. The specified VIM entry is executed in each of the PEs, PE0, PE1, PE2, and PE3.

EXAMPLE 1-2

Executing Synchronous MIMD iVLIWs from PE VIMs

```
! address register, loop, and other setup would be here
....
! startup VLIW execution
! f = parameter indicates default to LV flag setting
xv.p v0, 27, e = l, f=          ! execute VIM entry V0 + 27, LU only
xv.p v0, 28, e = lm, f=         ! execute VIM entry V0 + 28, LU, MAU only
xv.p v0, 29, e = lm, f=         ! execute VIM entry V0 + 29, LU, MAU only
xv.p v0, 27, e = lmd, f=        ! execute VIM entry V0 + 27, LU, MAU, DSU only
xv.p v0, 28, e = lamd, f=       ! execute VIM entry V0 + 28, all units except SU
xv.p v0, 29, e = lamd, f=       ! execute VIM entry V0 + 29, all units except SU
xv.p v0, 27, e = lamd, f=       ! execute VIM entry V0 + 27, all units except SU
xv.p v0, 28, e = lamd, f=       ! execute VIM entry V0 + 28, all units except SU
xv.p v0, 29, e = lamd, f=       ! execute VIM entry V0 + 29, all units except SU
! loop body - mechanism to enable looping has been previously set up
loop_begin: xv.p v0, 27, e = slamd, f=      ! execute v0 + 27, all units
            xv.p v0, 28, e = slamd, f=      ! execute v0 + 28, all units
loop_end: xv.p v0, 29, e = slamd, f=        ! execute v0 + 29, all units
```

Description of Exemplary Algorithm Being Performed

The iVLIWs defined in FIG. 4F are used to effect the dot product of a constant 3×1 vector with a stream of variable 3×1 vectors stored in PE local data memories. Each PE stores one element of the vector. PE1 stores the x component, PE2 stores the y component, and PE3 stores the z component. PE0 stores no component. The constant vector is held in identical fashion in a PE register, in this case, compute register R31.

In order to avoid redundant calculations or idle PEs, the iVLIWs operate on three variable vectors at a time. Due to the distribution of the vector components over the PEs, it is not feasible to use PE0 to compute a $_4$th vector dot product. PE0 is advantageously employed instead to take care of some setup for a future algorithm stage. This can be seen in the iVLIW load slots, as vector 1 is loaded in iVLIW 27 (component-wise across the PEs, as described above), vector 2 is loaded in iVLIW 28, and vector 3 is loaded in iVLIW 29 (li.p.w R*, A1+, A7). PE1 computes the x component of the dot product for each of the three vectors. PE2 computes the y component, and PE3 computes the z component (fmpy.pm.1fw R*, R*, R31). At this point, communication among the PEs must occur in order to get the y and z components of the vector 1 dot product to PE1, the x and z components of the vector 2 dot product to PE2, and the x and y components of the vector 3 dot product to PE3. This communication occurs in the DSU via the pexchg instruction. In this way, each PE is summing (fadd.pa.1fw R9, R7, R* and fadd.pa.1fw R10, R9, R8) the components of a unique dot product result simultaneously. These results are then stored (si.p.w R10, +A2, A6) into PE memories. Note that each PE will compute and store every third result. The final set of results are then accessed in round-robin fashion from PEs 1, 2, and 3.

Additionally, each PE performs a comparison (fcmpLE.pa.1fw R10, R0) of its dot product result with zero (held in PE register R0), and conditionally stores a zero (t.sii.p.w R0, A2+, 0) in place of the computed dot product if that dot product was negative. In other words, it is determined if the comparison is R10 less than R0? is true. This implementation of a dot product with removal of negative values is used, for example, in lighting calculations for 3D graphics applications.

While the present invention has been disclosed in the context of presently preferred methods and apparatus for carrying out the invention, various alternative implementations and variations will be readily apparent to those of ordinary skill in the art. By way of example, the present invention does not preclude the ability to load an instruction into VIM and also execute the instruction. This capability was deemed an unnecessary complication for the presently preferred programming model among other considerations such as instruction formats and hardware complexity. Consequently, the Load iVLIW delimiter approach was chosen.

We claim:

1. An indirect very long instruction word (VLIW) processing system comprising:

a first processing element (PE) having a VLIW instruction memory (VIM) for storing instructions in slots within a VIM memory locations;

a first register for storing a function instruction having a plurality of group bits defining instruction type and a plurality of unit field bits defining execution unit type;

a precoder for decoding the plurality of group bits and the plurality of unit field bits; and a load mechanism for loading the function instruction in an appropriate one of said slots in VIM based upon said decoding.

2. The system of claim 1 further comprising a control instruction which is an execute VLIW instruction (XV) containing an address offset and a base pointer to a base address register for purposes of indirectly executing VLIWs.

3. The system of claim 1 further comprising a control instruction which is a load/modify VLIW instruction (LV) containing an address offset and base pointer to a base address register for purposes of indirectly executing VLIWs.

4. The system of claim 1 wherein the group and unit field bits are stripped from the function instruction before it is stored in VIM so that more compact storage results.

5. The system of claim 1 wherein the group and unit field bits are stripped from the function instruction and at least one replacement bit is added to either the group or unit field bit positions before the control instruction is stored in VIM.

6. The system of claim 5 wherein the replacement bit is an enable/disable bit.

7. The system of claim 5 wherein the replacement bit is an operation code extension bit.

8. The system of claim 5 wherein the replacement bit is a register file extension bit.

9. The system of claim 5 wherein the replacement bit is a conditional execution extension bit.

10. The system of claim 8 further comprising a plurality of execution units, and first and second banks of registers and the register file extension bit is utilized, the plurality of execution units to read from or write to the first bank of registers or the second bank of registers.

11. The system of claim 1 further comprising a second register for storing the function instruction; a bypass path for connecting an output of the first register to an input of the second register; and a selection mechanism for selecting a bypass operation in which the function instruction is passed from the first register to the second register without being loaded into VIM.

12. The system of claim 11 wherein one or more of the group bits and unit field bits are replaced before storage of the control instruction in the second register.

13. The system of claim 1 further comprising at least one additional PE connected through a network interface connection to the first PE, and each PE has an associated cluster switch connected to a receive port which is controlled thereby.

14. The system of claim 13 wherein the associated cluster switch comprises a multiplexer interconnected to provide independent paths between the PEs in a cluster of PEs.

15. The system of claim 1 further comprising a sequence processor (SP) connected to the first PE and providing both a control instruction and said function instruction to the first PE, the control instruction being either an execute VLIW instruction (XV) or a load/modify VLIW instruction (LV), both the XV and LV instructions containing an address offset and base pointer for purposes of indirectly executing VLIWs.

16. The system of claim 15 further comprising at least one additional PE connected to the SP and said control instructions are provided synchronously to both the first PE and said at least one additional PE causing said PEs to operate as a synchronous multiple instruction multiple data stream (SMIMD) machine when executing different VLIWs at the same VIM address, and said PEs will operate as a SMID machine otherwise.

17. The system of claim 16 wherein a plurality of PEs are connected to the SP and the plurality of PEs is organized into first and second groups of one or more PEs.

18. The system of claim 17 wherein the first group of PEs indirectly operate on a VLIW instruction at a first VIM address during a cycle of operation and the second group of PEs indirectly operate on a different VLIW instruction at the same first VIM address during the cycle of operation.

19. The system of claim 17 wherein the plurality of PEs operate following a receive model of communication control in which each PE has a receive port and controls whether data is received at the receive port.

20. The system of claim 19 whereby each PE has an input multiplexer connected to the receive port and controls communication by controlling said input multiplexer.

21. The system of claim 19 wherein the plurality of PEs are programmed to cooperate by storing a cooperating instruction so that one PE has a receive instruction specifying the path that the other PE is making data available in the same location in VIM for each of said plurality of PEs.

22. The system of claim 17 further comprising a masking mechanism for masking individual PEs ON or OFF.

23. The system of claim 22 in which VIMs for PEs masked ON are loaded and VIMs for PEs masked OFF are not loaded during a load VLIW operation.

24. The system of claim 17 wherein different PEs execute different VLIWs during the same cycle.

25. The system of claim 1 wherein the VIM comprises slots for storing function instructions of the following type: store unit instructions; load unit instructions; arithmetic logic unit instructions; multiply-accumulate unit instructions; or data select unit instructions.

26. The system of claim 25 wherein a plurality of PEs are employed and a VLIW slot or slots are associated with different tasks allowing a PE to perform multiple operations on different tasks simultaneously in the same cycle.

27. A very long instruction Word (VLIW) processing system comprising:
    a first processing element (PE) having a VLIW memory (VIM) for storing VLIWs in slots at a specified VIM address;
    a first register for storing both control and function instructions;
    a predecoder for differentiating between the control and function instructions through decoding a plurality of group bits; and
    a load mechanism for loading the function instructions in an appropriate one of said slots in VIM based upon said decoding of said control instruction.

28. The VLIW processing system of claim 27 further comprising a sequence processor (SP) controller which dispatches to the PE a load VLIW (LV) delimiter followed by a sequence of instructions to be loaded into a VIM address in said VIM that were specified in the LV delimiter.

29. A single instruction multiple data stream (SIMD) machine with at least two processing elements (PE), each PE in said SIMD machine operating indirectly on VLIW instructions stored in a VLIW memory (VIM) with the indirect execution initiated by an execute VLIW (XV) instruction and with different VLIW instructions stored in the PEs at the same VIM address.

30. The machine of claim 29 wherein the XV instruction contains an offset address and a pointer to a base address register for each of the PEs for the purposes of indirectly executing VLIWs.

31. The machine of claim 29 wherein the instructions are stored in the multiple PE VIMs utilizing a load control instruction (LV) that sets up the loading process and loads the instructions as they are received into the VIMs in the multiple PEs.

32. The machine of claim 30 further comprising a SIMD sequence processor (SP) controller wherein the control instructions XV and LV are dispatched to the PEs by the SIMD SP controller.

33. An indirect very long instruction word (VLIW) processing method comprising:
    fetching a first VLIW function instruction to be stored in a VLIW instruction memory (VIN) in a first processing element (PE), said VLIW function instruction having a plurality of group bits defining instruction type and a plurality of unit field bits defining execution unit type;
    storing the first function instruction in a first register;
    decoding the plurality of group bits and the plurality of unit field bits utilizing a predecoder; and
    loading the function instruction in said VIM at an appropriate address with a load mechanism for said VIM based upon said decoding.

34. The method of claim 33, further comprising the step of receiving a control instruction which is an execute VLIW instruction (XV) containing an address offset and a base pointer to a base address register for purposes of indirectly executing VLIWs.

35. The method of claim 33 further comprising the step of receiving a control instruction which is a load/modify VLIW instruction (LV) containing an address offset and base pointer to a base address register for purposes of indirectly executing VLIWs.

36. The method of claim 33 further comprising the step of stripping the group and unit field bits from the function instruction before it is stored in VIM so that more compact storage results.

37. The method of claim 33 further comprising the steps of stripping the group and unit field bits from the function instruction and adding at least one replacement bit to either the group or unit field bit positions before the control instruction is stored in VIM.

38. The method of claim 33 further comprising the steps of receiving a bypass instruction and storing the first VLIW function instruction in a second register without loading it into VIM.

39. The method of claim 33 further comprising the steps of receiving both a control instruction and said function instruction to the first PE, the control instruction being either an execute VLIW instruction (XV) or a load/modify VLIW instruction (LV) both the XV and LV instructions containing an address offset and base pointer for purposes of indirectly executing VLIWs from a sequence processor (SP) connected to the first PE.

40. A very long instruction word (VLIW) processing method comprising:

fetching function instructions to be stored in a VLIW memory (VIM), in a first processing element (PE), for storing VLIW instructions in slots at a specified VIM address;

storing both the first function instructions and control instructions in a first register;

decoding a plurality of group bits utilizing a predecoder to differentiate between the control and function instructions; and loading the function instructions in an appropriate one of said slots in VIM based upon said decoding of said control instruction.

41. The VLIW method of claim 38 further comprising the step of receiving a load VLIW (LV) delimiter followed by a sequence of instructions to be loaded into a VIM address in said VIM that were specified in the LV delimiter from a sequence processor (SP) controller.

* * * * *